US010623403B1

(12) United States Patent
Gupta et al.

(10) Patent No.: US 10,623,403 B1
(45) Date of Patent: *Apr. 14, 2020

(54) LEVERAGING MULTIPLE AUDIO CHANNELS FOR AUTHENTICATION

(71) Applicant: PINDROP SECURITY, INC., Atlanta, GA (US)

(72) Inventors: Payas Gupta, Atlanta, GA (US); Terry Nelms, II, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/240,481

(22) Filed: Jan. 4, 2019

Related U.S. Application Data

(60) Provisional application No. 62/646,775, filed on Mar. 22, 2018.

(51) Int. Cl.
*H04L 29/06* (2006.01)

(52) U.S. Cl.
CPC ...... *H04L 63/0853* (2013.01); *H04L 63/0884* (2013.01); *H04L 63/102* (2013.01);
(Continued)

(58) Field of Classification Search
CPC ............. H04L 63/0853; H04L 63/0884; H04L 63/102; H04L 63/126; H04L 63/1491
See application file for complete search history.

(56) References Cited

U.S. PATENT DOCUMENTS 7,555,539 B1   6/2009 Rosenberg et al.
7,668,718 B2   2/2010 Kahn et al.
(Continued)

FOREIGN PATENT DOCUMENTS

FR   3010214 A1   3/2015
FR   3023115 A1   1/2016
(Continued)

OTHER PUBLICATIONS

Notification of Transmittal of the International Search Report and the Written Opinion of the International Searching Authority, dated Aug. 27, 2018, issued in corresponding International Application No. PCT/US2-018/041779, 14 pages.
(Continued)

*Primary Examiner* — Baotran N To
(74) *Attorney, Agent, or Firm* — Eric L. Sophir; Foley & Lardner LLP

(57) ABSTRACT

Disclosed herein are embodiments of systems, methods, and products comprises an authentication server for authentication leveraging multiple audio channels. The server receives an authentication request regarding a user upon the user interacting with a first electronic device. The server requests the first device to transmit a first audio file of an audio sample to the server. The audio sample may be the user's audio command or a machine-generated audio signal. The server requests a second electronic device to transmit a second audio file that is the recording of the same audio sample to the server. The second electronic device is a trusted device in proximity of the first device and executes an authentication function to enable the recording and transmitting of the audio sample. The server determines a similarity score between the first audio file and the second audio file and authenticates the user based on the similarity score.

20 Claims, 11 Drawing Sheets

(52) U.S. Cl.
CPC ........ *H04L 63/126* (2013.01); *H04L 63/1491* (2013.01); *H04L 63/0861* (2013.01)

(56) References Cited

U.S. PATENT DOCUMENTS

| | | | |
|---|---|---|---|
| 8,676,579 | B2 | 3/2014 | Hymel |
| 8,769,643 | B1 | 7/2014 | Ben Ayed |
| 9,113,240 | B2 | 8/2015 | Ramakrishnan et al. |
| 9,236,052 | B2 | 1/2016 | Timem et al. |
| 9,384,751 | B2 | 7/2016 | Venkatesha et al. |
| 9,430,625 | B1 | 8/2016 | Gador et al. |
| 9,608,970 | B1 | 3/2017 | Gehret et al. |
| 9,654,469 | B1 * | 5/2017 | Yang ................... H04L 63/0861 |
| 9,697,822 | B1 | 7/2017 | Naik et al. |
| 9,843,583 | B2 | 12/2017 | Holz |
| 9,881,616 | B2 | 1/2018 | Beckley et al. |
| 9,892,732 | B1 | 2/2018 | Tian et al. |
| 9,967,432 | B2 | 5/2018 | Numakura |
| 10,027,662 | B1 | 7/2018 | Mutagi et al. |
| 10,063,542 | B1 | 8/2018 | Kao |
| 10,068,421 | B2 | 9/2018 | Alderucci |
| 10,374,816 | B1 | 8/2019 | Leblang et al. |
| 2005/0071168 | A1 | 3/2005 | Juang et al. |
| 2006/0218621 | A1 | 9/2006 | Covington et al. |
| 2011/0219427 | A1 | 9/2011 | Hito et al. |
| 2013/0063126 | A1 | 3/2013 | Cong et al. |
| 2013/0174243 | A1 | 7/2013 | Inatomi et al. |
| 2013/0176826 | A1 | 7/2013 | Li |
| 2014/0046664 | A1 | 2/2014 | Sarkar et al. |
| 2014/0164244 | A1 | 6/2014 | Wilson |
| 2015/0215299 | A1 * | 7/2015 | Burch ..................... H04L 63/08 726/5 |
| 2015/0222601 | A1 | 8/2015 | Metz et al. |
| 2015/0234624 | A1 | 8/2015 | Nii et al. |
| 2016/0234206 | A1 | 8/2016 | Tunnell et al. |
| 2016/0283681 | A1 | 9/2016 | Falck et al. |
| 2017/0006028 | A1 | 1/2017 | Tunnell et al. |
| 2017/0011406 | A1 | 1/2017 | Tunnell et al. |
| 2017/0026380 | A1 | 1/2017 | Liebl, III et al. |
| 2017/0133011 | A1 | 5/2017 | Chen et al. |
| 2017/0330563 | A1 | 11/2017 | Daley et al. |
| 2017/0331807 | A1 | 11/2017 | Mont-Reynaud et al. |
| 2018/0014197 | A1 | 1/2018 | Arana |
| 2018/0018964 | A1 | 1/2018 | Reilly et al. |
| 2018/0039768 | A1 | 2/2018 | Roberts et al. |
| 2018/0047386 | A1 | 2/2018 | Garner et al. |
| 2018/0063126 | A1 | 2/2018 | Karapantelakis et al. |
| 2018/0069854 | A1 | 3/2018 | Chakraborty et al. |
| 2019/0108837 | A1 | 4/2019 | Christoph et al. |

FOREIGN PATENT DOCUMENTS

| | | |
|---|---|---|
| FR | 3047583 A1 | 8/2017 |
| FR | 3048145 A1 | 8/2017 |
| FR | 3052614 A1 | 12/2017 |
| WO | 2014063363 A1 | 5/2014 |
| WO | 2015033061 A1 | 3/2015 |
| WO | 2016060999 A1 | 4/2016 |
| WO | 2016141972 A1 | 9/2016 |

OTHER PUBLICATIONS

Hua-Hong Zhu et al., "Voiceprint-biometric template design and authentication based on cloud computing security", Cloud and Service Computing (CSC), 2011 International Conference on, IEEE, Dec. 12, 2011, pp. 302-308, XP032102717.

Yingkai Miao et al., "A Kind of Identity Authentication Under Cloud Computing Environment", 2014 7th International Conference on Intelligent Computation Technology and Automation, IEEE, Oct. 25, 2014, pp. 12-15, XP032717006.

Zhang et al., VoiceLive: A Phoneme Localization Based Liveness Detection for Voice Authentication on Smartphones, retrieved from the Internet: http://ww2.cs.fsu.edu/~tan/paper/ccs2016.pdf. CCS'16, Oct. 24-28, 2016, Vienna, Austria, 12 pages.

Karapanos et al., Sound-Proof: Usable Two-Factor Authentication Based on Ambient Sound, USENIX Security Symposium, retrieved from: https://www.usenix.org/system/files/conference/usenixsecurity15/sec15-paper-paper-karapanos.pdf, Aug. 14, 2015, 17 pages.

Notification of Transmittal of the International Search Report and the Written Opinion of the International Searching Authority, dated May 3, 2019, in corresponding International Application No. PCT/US2019/019349 14 pages.

Notification of Transmittal of the International Search Report and the Written Opinion of the International Searching Authority, dated May 3, 2019, in corresponding International Application No. PCT/US2019/019353, 13 pages.

* cited by examiner

LEVERAGING MULTIPLE AUDIO CHANNELS FOR AUTHENTICATION

CROSS REFERENCE TO RELATED APPLICATIONS

This application claims priority to U.S. Provisional Patent Application Ser. No. 62/646,775, filed Mar. 22, 2018, which is hereby incorporated by reference in its entirety.

This application is related to U.S. patent application Ser. No. 16/035,301, filed Jul. 13, 2018, which is hereby incorporated by reference in its entirety.

TECHNICAL FIELD

This application relates generally to systems and methods for user authentication and/or enrollment using multiple audio channels.

BACKGROUND

As the sophistication of threats that target sensitive data and critical systems grows, the importance of robust security mechanisms becomes even more important. Authentication is a key requirement to ensure that a request that claims to come from a certain source indeed does come from it. For example, an authentication system verifies using a factor (e.g., a password, a token) that a user is indeed he or she purports to be.

Conventional authentication systems and methods are cumbersome, tedious, and not user-friendly. For example, some conventional authentication methods use knowledge-based questions to authenticate users based on what the users know. A user trying to access a service, e.g., calling a call center of a financial institution, may have to answer some questions of private information to prove his/her identity. The user therefore has to actively perform some additional and often inconvenient steps for authentication. Other conventional methods use one-time passwords for a second factor authentication. When a user is trying to log into a website, these conventional methods may send the user a text message including a one-time password. The user may have to enter the received one-time password on the website within a short time to prove his/her identity. These methods may also be insecure, inconvenient, inefficient, and cumbersome, because they require multiple steps within a short time duration for authentication. Such inconvenience may result in negative user experience.

SUMMARY

What is therefore desired are systems and methods for a significantly improved authentication that may be more efficient and may involve a fewer number of steps to be performed by a user.

Embodiments disclosed herein attempt to overcome the aforementioned technical challenges and may provide other benefits as well. More particularly, the embodiments disclosed herein may provide an efficient authentication and/or enrollment by reducing user interaction. Specifically, embodiments disclosed herein leverage multiple audio channels for authentication. For example, a user may interact with a first device, and a second device may be a trusted/registered device (e.g., the user's mobile device) that is in proximity to the first device. These two devices may capture the same audio sample, such as the user's voice command. An authentication server may authenticate the user's identity by comparing the captured audio recordings from the two devices. By verifying that the audio recordings from the two audio channels are similar and recorded at the same time, the authentication server may determine the registered mobile device (the second device) is in proximity with the first device. Furthermore, the authentication server may determine that the owner of the mobile device is present and not an imposter and thus authenticate the user. The authentication process is automatic, seamless, and frictionless. Furthermore, the authentication process is effortless from the perspective of the user, who merely needs a registered device that can capture an audio sample and is in proximity to the other device used by the user.

The authentication process may also function without the user providing a voice command. Instead, one of the devices may generate an acoustic signal (e.g., audible, ultrasound, or infrasound) and the other device may listen to the acoustic signal. The authentication server or one of the devices may determine if there is a match between the generated acoustic signal and the received acoustic signal. For example, a user may attempt logging into a bank website on a laptop using a username and password. The laptop may generate an acoustic signal and trigger a mobile device in the user's pocket to start listening. Upon receiving a command, the mobile device may listen to the acoustic signal. An authentication server or the mobile device may compare the generated acoustic signal with the received acoustic signal. If these signals are similar within a threshold, the authentication server or the mobile device authenticates the user.

In an embodiment, a computer-implemented method comprises receiving, by a server, a request to authenticate a user associated with at least one of a first electronic device and a second electronic device; generating and transmitting, by the server, a push request to the second electronic device in proximity to the first electronic device causing the second electronic device to execute an authentication function; receiving, by the server, an audio file from the second electronic device in proximity to the first electronic device, wherein the audio file contains an acoustic signal generated by the first electronic device and captured by the authentication function in the second electronic device; comparing, by the server, the acoustic signal and the audio file to generate a similarity score; and authenticating, by the server, the user in response to the server determining that the similarity score is above a threshold.

In another embodiment, a system comprises a non-transitory storage medium storing a plurality of computer program instructions; and a processor electrically coupled to the non-transitory storage medium and configured to execute the plurality of computer program instructions to: receive a request to authenticate a user associated with at least one of a first electronic device and a second electronic device; transmit a push request to the second electronic device in proximity to the first electronic device causing the second electronic device to execute an authentication function; receive an audio file from the second electronic device in proximity to the first electronic device, wherein the audio file contains an acoustic signal generated by the first electronic device and captured by the authentication function in the second electronic device; compare the acoustic signal and the audio file to generate a similarity score; and authenticate the user in response to the processor determining that the similarity score is above a threshold.

In another embodiment, a computer implemented method comprises receiving, by a server, a request to enroll a user associated with at least one of a first electronic device and a second electronic device to a service; transmitting, by the server, a push request to the second electronic device in proximity to the first electronic device causing the second electronic device to execute an enrollment function; receiving, by the server, an audio file from the second electronic device in proximity to the first electronic device, wherein the audio file contains an acoustic signal generated by the first electronic device and captured by the captured by the enrollment function in the second electronic device; comparing, by the server, the acoustic signal and the audio file to generate a similarity score; and enrolling, by the server, the user to the service in response to the server determining that the similarity score is above a threshold.

In yet another embodiment, a computer-implemented method comprises receiving, by a second electronic device in proximity to a first electronic device, a request to record an acoustic signal from an authentication server; receiving, by the second electronic device from the authentication server, an audio file configured to be played by the first electronic device to generate the acoustic signal; recording, by the second electronic device, the acoustic signal generated by the first electronic device; comparing, by the second electronic device, the acoustic signal and the audio file to generate a similarity score; and transmitting, by the second electronic device to the authentication server, the similarity score to the authentication server such that the authentication server authenticates a user associated with the first and second electronic devices based upon the similarity score.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1A:
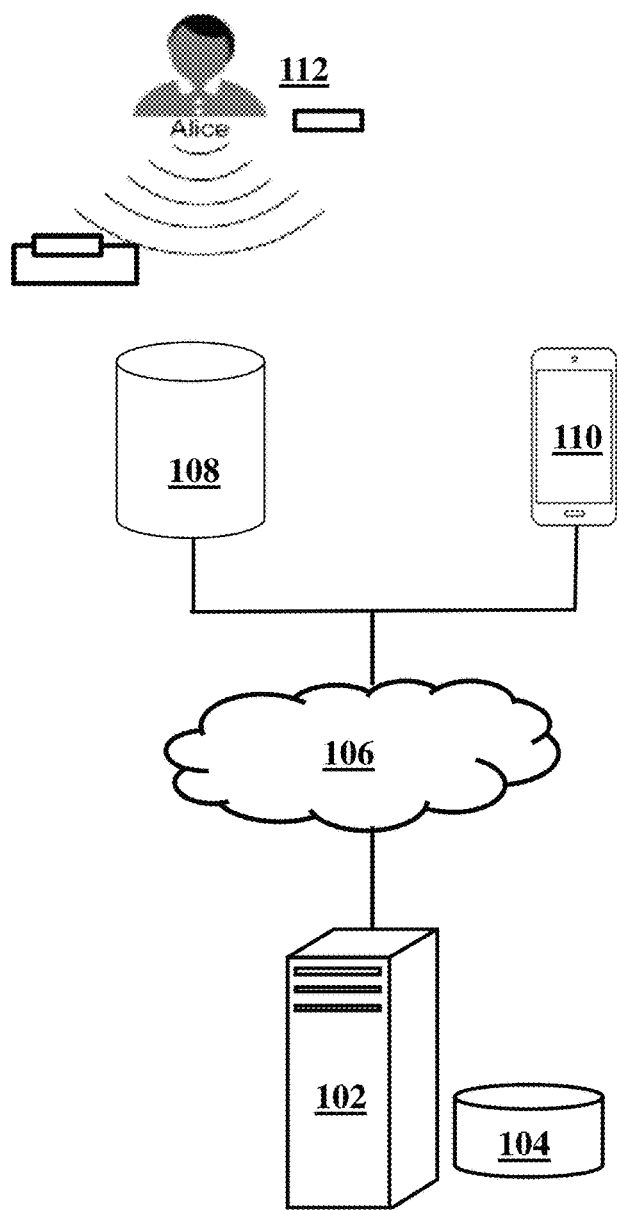
FIG. 1A shows an illustrative system for authenticating/enrolling a user leveraging multiple audio channels based on users' voice, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for a seamless and frictionless authentication of users. The systems and methods authenticate users by capturing audio samples from multiple different sources in real time with at least one of the multiple sources is a trusted device associated with respective users. If the audio samples from multiple different sources are the same or similar within a threshold, it may indicate the different sources are in close proximity to each other. Because the trusted device is also in close proximity to other sources, it implies the user associated with the trusted device is present not some imposter. As a result, the authentication process leveraging multiple audio channels can authenticate the user with minimal user interaction. It should be understood that the embodiments disclosed herein describe user authentication merely for the ease of explanation. The embodiments for authentication should apply for user enrollment to a service as well.

In one example of authentication to IoT (Internet of Things) devices, a user initiates a command by uttering a trigger phrase (or word) to a smart speaker or voice-controlled intelligent personal assistant or any other device which is capable of taking inputs from the user using voice medium. The IoT device, upon hearing the trigger phrase, sends a request to the registered mobile device of the user to start recording. Upon receiving the request, the mobile device may record at least a portion of the command following the trigger phrase, e.g., "how much do I have in my bank account?" Alternatively, the mobile device may record follow up commands to the previously provided commands. In some instances, the registered mobile device may be continuously recording and may maintain a buffer of a few seconds. In these instances, the registered mobile device may record the trigger phrase and at least a portion of the command following the trigger phrase. The server therefore receives the two captured recordings: one from the voice-controlled intelligent personal assistant or corresponding backend server and the other from the user's mobile device (which is the trusted device) to authenticate the user. If the mobile device is in close proximity of the person speaking, then the voice captured on both channels will be similar. An authentication system may utilize the similarity to determine that the user is near to the trusted device and the IoT device. It should be understood that the mobile device is used merely as an example, and other electronic devices with audio generation and/or audio capture functionality should be considered within the scope of this disclosure.

In another example of authentication over phone call to call center agent, a user initiates a call to the call center. After entering the account number via the interactive voice response (IVR), the user speaks a few statements (could be what is your name and the purpose of the call or some other random statement). The user's mobile phone (the trusted device) sends the user's audio in live over the phone call and captures the audio via the authentication function on the mobile phone. Thereafter, the server receives the two audio files (one from the call center, the other from the mobile phone) authenticates the user based on the similarity between the two audio files. It should be understood that the above example of the user's mobile device as a trusted device should not be considered limiting and other devices such as a Voice over Internet Protocol (VoIP) phone and an IoT device (e.g., a voice-controlled intelligent personal assistant) should also be considered within the scope of this disclosure. It should be understood that the audio file may include audio stream in real-time, raw audio of the user's voice, any artifact extracted from the audio (e.g., i-vectors), and/or a transcription (e.g., text-to-speech) of the user's voice.

In yet another example of authentication, a user goes to a website using a computer and starts a login process by typing in a username and password. The login may require two-factor authentication with the second factor being what the user has (e.g., a mobile phone). The server may send a notification to the mobile phone on file for the user to start listening. Once the mobile phone starts listening, the computer may play an acoustic signal (e.g., ultrasonic, infrasonic, or audible signal) that is captured by the mobile phone's (e.g. a registered device) microphone. The server may compare the acoustic signal captured by the mobile phone against the acoustic signal generated by the computer. The server may authenticate the user if the acoustic signals match within an error bound. It should be understood that the audio comparison may done at the mobile phone or at the server end by streaming the content back to the server from the mobile phone. It should further be understood that the audio file being played for the acoustic signal may be generated by the mobile phone, the server, or by both mobile phone and the server using a shared mechanism.

It should be understood that the embodiments of the registered (or trusted) device automatically starting recording in response to receiving a request/trigger should not be considered limiting. The registered device may provide a prompt to the user for allowing the recording functionality. For example, in response to receiving a request/trigger, the registered device may showing a graphical object (e.g., a dialog box) with the user to allow or decline a recording. The user may perform actions such as selecting an option in the graphical object, pressing a button, or providing a voice command to allow or decline the recording of the user's voice.

FIG. 1A illustrates a system 100A for authentication leveraging multiple audio channels based on users' audio (e.g., a voice input), according to an embodiment. The system 100A may comprise an authentication server 102, a user database 104, an IoT device 108, and a registered user device 110 that are connected with each other via hardware and software components of one or more networks 106. Examples of the network 106 include, but are not limited to, Local Area Network (LAN), Wireless Local Area Network (WLAN), Metropolitan Area Network (MAN), Wide Area Network (WAN), Ad-hoc network, and the Internet. The communication over the network 106 may be performed in accordance with various communication protocols, such as Transmission Control Protocol and Internet Protocol (TCP/IP), User Datagram Protocol (UDP), and IEEE communication protocols.

The IoT device 108 may be any computing device comprising a processor, memory, power resources, and network connectivity to perform various tasks. The IoT device 108 may also have a capacity to capture and process voice and initiate task accordingly. As a result, a user 112 may be able to interact with the IoT device 108 through voice medium. Therefore, the IoT device 108 may comprise a microphone and an optional speaker for a feedback/response. For example, the IoT device 108 may be any physical devices, home appliances, and other items embedded with electronics, software, sensors, and network connectivity. The user 112 may issue an electronic request by making audio commands by speaking to an IoT device 108, such as a voice-controlled intelligent personal assistant (e.g., Amazon Echo, Google Home). For instance, the user may issue a command to the voice-controlled personal assistant by speaking natural sentences such as "turn on the microwave oven." IoT devices 108 like voice-controlled intelligent personal assistants have always-on microphones and may use voice-based authentication for increased usability and security (e.g., voice commands are only processed when they come from the owner). Thus, the IoT device 108 may need to authorize the user before performing the task or returning the requested service. The IoT device 108 may send an authentication request to the authentication server 102. The authentication request may comprise the user's identifier (ID). The authentication server 102 may leverage such IoT devices 108 as the audio channels and authenticate users based on the audio recording captured by such IoT devices 108.

It should be understood that the IoT devices 108 may not only refer to electronic devices the user utilizes to issue a request, such as voice-controlled intelligent personal assistants, but also the backend servers of the IoT devices. It should further be understood that the IoT devices 108 are merely for the ease of explanation and should not be considered limiting. As described in the embodiments below, the IoT devices 108 may be replaced by any electronic device capable of capturing an audio, e.g., a mobile phone.

The authentication server 102 may be any computing device comprising a processor and other computing hardware and software components, configured to process the authentication requests. The authentication server 102 may be logically and physically organized within the same or different devices or structures and may be distributed across any number of physical structures and locations (e.g., cabinets, rooms, buildings, cities). The authentication server 102 may receive the authentication request from the IoT device 108. The authentication server 102 may verify that the user issuing the request is indeed the registered user for the corresponding service. The authentication server 102 may perform the authentication by leveraging multiple audio channels. The IoT device 108 may act as the first audio channel. The authentication server 102 may need at least a second audio channel that may be registered user device 110 in the close proximity of the IoT device 108.

The registered user device 110 may be any computing device having the capacity to capture and process audio and to communicate with the authentication server 102. The registered user device 110 may be any computing device comprising a processor and non-transitory machine-readable storage medium. The examples of the computing device may include, but are not limited to, a mobile phone, a tablet computer, a smart watch, a smart wearable, a smart doorbell device, and the like. The registered user device 110 may be a trusted device that is registered with the authentication server 102. The registered user device 110 (e.g., registered mobile phone of the user) may execute an authentication function performing the client side (e.g., at the registered user device 110) authentication operations. In some embodiments, the authentication function may be implemented by an application (e.g., an "authentication" or an "enrollment" app) installed in the registered user device 110. The user 112 may need to register to the authentication server 102 to enable one or more operations disclosed herein. The authentication server 102 may communicate with the authentication function to enable/trigger the recording function on the registered user device 110. The registered user device 110 may be in close proximity of the IoT device 108. When the IoT device is activated by the user 112 by uttering a trigger phrase, the registered user device 110 may be triggered by the IoT device 108 or the authentication server 102 to start listening. The registered user device 108 may capture at least a portion of the command (and/or a follow up command) following the trigger phrase. In some instances, the registered user device 108 may be continuously recording, maintaining a buffer of a few seconds and may be able to record the trigger phrase as well. Thus, the registered user device 110 may record the user's audio sample after the user activates the IoT device 108 to issue the audio command. As a result, the IoT device 108 may act as the first audio channel, and the registered user device 110 may act as the second audio channel for the authentication process.

It should be understood that the embodiments of the registered user device 108 automatically starting recording in response to receiving a request/trigger should not be considered limiting. The registered user device 108 may provide a prompt to the user for allowing the recording functionality. For example, in response to receiving a request/trigger, the registered device may showing a graphical object (e.g., a dialog box) with the user to allow or decline a recording. The user may perform actions such as selecting an option in the graphical object, pressing a button, or providing a voice command to allow or decline the recording of the user's voice.

The user database 104 may any non-transitory machine-readable media configured to store the registered users' data. Specifically, the user database 104 may comprise the user identifier, the registered user device identifier, and the like. The user database 104 may include any other related data of the users that may be used for authentication.

After receiving an authentication request (e.g., in response to the IoT device 108 hearing a trigger phrase) comprising the user's identifier, the authentication server 102 may access the user database 104 and retrieve a device identifier of a registered device 110 associated with the user. For example, the registered user device 110 may be a mobile phone of the user. The authentication server 102 may send a request to the IoT device 108 to stream the audio recording of the user's audio sample from the IoT device 108. In the meantime, the authentication server 102 may send a request to the installed application on the registered user device 110 to stream the audio recording from the registered user device 110. The authentication function in the registered user device 110 may enable the registered user device 110 to stream the audio recording to the authentication server 102. As a result, the authentication server 102 may receive a first audio file (via a first audio stream) from the IoT device 108 and a second audio file (via a second audio stream) from the registered user device 110. Each of the first and the second audio files may include at least a portion of the user's audio command after the trigger phrase was spoken. In the instances where the registered user device 110 continuously records and maintains a buffer, each of the first and the second audio files may include a recording of the trigger phrase as well.

It should be understood that the user may have multiple registered user devices (e.g., multiple mobile devices registered with the authentication server 102). In some instances, the authentication server 102 may send a request to all the registered devices to start recording when the authentication server 102 receives an authentication request. In other instances, the authentication server 102 send the request to start recording to the registered device that was active lately. The authentication server 102 may also use other features such as the geolocation of the registered device to determine that the registered device is near to the IoT device 108. In these cases, the authentication server 102 may send the request to start recording to the registered device near to the IoT device 108.

When the IoT device 108 and the registered user device 110 are in close proximity to each other (e.g., located within a predetermined distance threshold such that both devices can hear the user), the audio files of the same audio sample on the two electronic devices may be similar. The authentication server 102 may leverage such similarity to verify the presence of the registered user device 110 at the IoT device 108 for the issued electronic request. The registered user device 110 may therefore act as the representative of a user 112: the presence of the registered user device 110 may imply the presence of the user 112. The authentication server 102 may authenticate the user 112 for the request when the authentication server 102 determines that the user is present near to the IoT device 108. After authentication, the authentication server 102 may transmit a request (or instruction) to the IoT device 108 or its back-end server to execute a command from the user.

In operation, the authentication server 102 may determine a similarity score between the first audio file and the second audio file. The authentication server 102 may compare the similarity score with a score threshold (e.g., a predetermined value). If the similarity score satisfies the threshold, the authentication server 102 may determine the registered user device (e.g., user's mobile phone) 110 is within a distance threshold of the IoT device 108 used by the user. Furthermore, the authentication server 102 may determine that the user 112 associated the registered user device 110 (e.g., mobile phone), not some imposter, is present for the issued electronic request, and may thus authenticate the user 112. If the similarity score does not satisfy the threshold, the authentication server 102 may determine the user 112 is not a trusted/registered user. The authentication server 102 may send the authentication result to the IoT devices (or backend servers of the IoT devices) 108. Based on the authentication result, the IoT device 108 may either authorize the services corresponding to the user's 112 electronic request or deny the user's 112 electronic request.

Figure 1B:
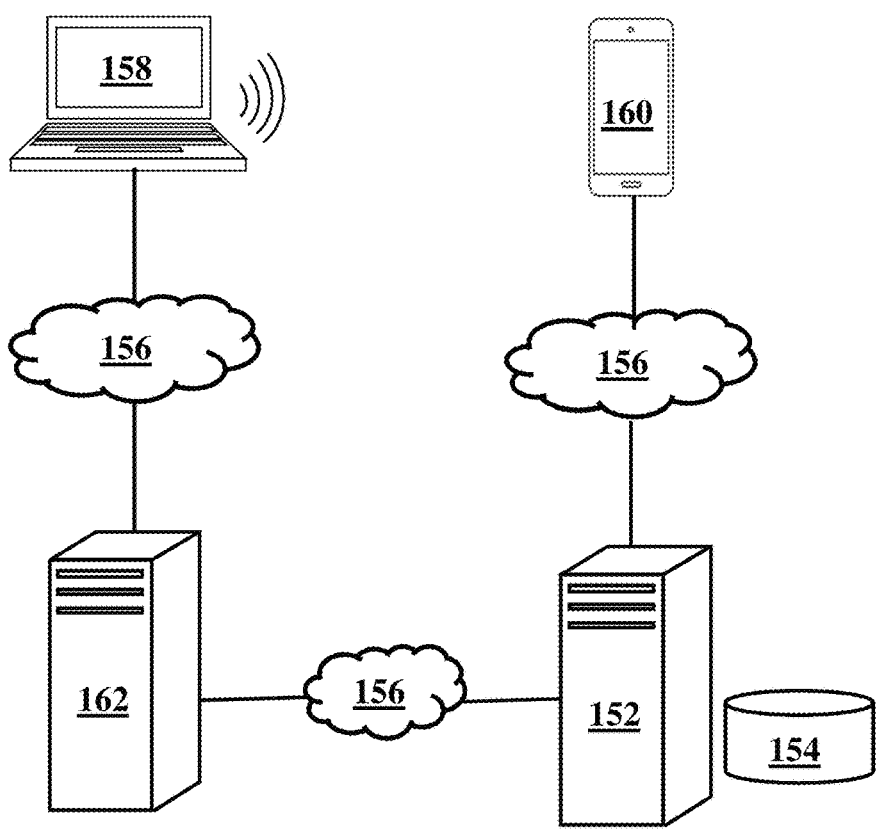
FIG. 1B shows an illustrative system for authenticating/enrolling a user leveraging multiple audio channels based on machine generated audio, according to an embodiment.

FIG. 1B illustrates a system 100B for authentication leveraging multiple audio channels based on machine generated audio, according to an embodiment. The system 100B may comprise an authentication server 152, a user database 154, an electronic client device 158, a webserver 162, and a registered user device 160 that are connected with each other via hardware and software components of one or more networks 156. Examples of the network 156 include, but are not limited to, LAN, WLAN, MAN, WAN, and the Internet. The communication over the network 156 may be performed in accordance with various communication protocols, such as TCP/IP, UDP, and IEEE communication protocols.

The electronic client device 158 may be any computing device allowing a user to issue an electronic request. The electronic client device 158 may comprise a processor and non-transitory machine-readable storage medium and configured to produce an audio sample, such as an acoustic signal. The examples of the electronic client device 158 may include, but are not limited to, a desktop computer, a laptop, a personal digital assistant (PDA), a mobile phone, a tablet computer, and the like. The electronic client device 158 may comprise any number of input and output devices supporting various types of data, such as text, image, audio, video, and the like.

A user may interact with the electronic client device 158 to issue a request. The user may issue a request by visiting a website hosted by a webserver 162. The electronic client device 158 may display the graphical user interface (GUI) of the website. For example, the user may try to access his/her bank account to conduct an online transaction. The user may try to log into an account of the website. The webserver 162 may display a website GUI on the electronic client device 158 presenting a login prompt that requires the user to input account information (e.g., user identifier information) on the GUI. The user may use a web browser run on the electronic client device 158 to input account information and communicate with the webserver 162. In operation, the webserver 162 may prompt the user to enter a user name and password, personal identification number (PIN), and the like. Thereafter, the webserver 162 may pursue to verify the user's identity using a second factor authentication. Therefore, after the webserver 162 receives the login account information, the webserver 162 may send an authentication request regarding the user to the authentication server 152. The authentication request may comprise the user's ID.

The webserver 162 may be also called an HTTP server, may be any computing device comprising a process or and other computing hardware and software components, configured to host content, such as a website. A website is a collection of related web pages, including multimedia content, typically identified with a common domain name, and published on at least one webserver. Web users operating electronic client devices 158 may access the website by referencing a uniform resource locator (URL) that identifies the site. A website may be accessible via one or more networks 140 including a public Internet Protocol (IP) network, such as the Internet. or a private LAN. The webserver 162 may also comprise software that runs on the computing device that retrieves and delivers the web pages in response to requests from the website's users operating electronic client devices 158. The webserver 162 may provide security and privacy for the user by authenticating the user's identity. The webserver 162 may collaborate and communicate with the authentication server 152 for the authentication process over the network 156.

The authentication server 152 may be any computing device comprising a processor and other computing hardware and software components, configured to process the authentication requests. The authentication server 152 may be logically and physically organized within the same or different devices or structures, and may be distributed across any number of physical structures and locations (e.g., cabinets, rooms, buildings, cities). The authentication server 152 may also receive the authentication request from the electronic client device 158. The authentication server 152 may verify the user issuing the request is indeed the registered user for the corresponding service. The authentication server 152 may perform the authentication by leveraging multiple audio channels.

The authentication server 152 may first request the electronic client device 158 to produce an audio sample, for example, emitting an acoustic signal that is detectable by the registered user device 160. For example, the authentication server 152 may collaborate with the webserver 162 to authenticate the user. Specially, the authentication server 152 may request the webserver 162 to instruct the electronic client device to produce the audio sample. The registered user device 160 may capture or record the audio sample generated by the electronic client device 158. The acoustic signal may include one or more of ultrasonic signals, infrasonic signals, and/or audible signals. The use of ultrasonic and/or infrasonic signals may allow the system 100B to perform authentication operations silently without the user hearing the acoustic signals.

The registered user device 160 may be any computing device configured to capture and process audio and to communicate with the authentication server 152 over the network 156. The registered user device 160 may be any computing device comprising a processor and non-transitory machine-readable storage medium. The examples of the computing device may include, but are not limited to, a mobile phone, a tablet computer, a smart watch, and the like. The registered user device 160 may be a trusted device that is registered with the authentication server 152. The registered user device 160 may execute an authentication function performing the client side (e.g., at the registered user device 160) authentication operations. In some embodiments, the registered user device 160 (e.g., registered mobile phone of the user) may have an application (e.g., an "authentication" app) installed to implement the authentication function. The user may need to pre-register to the authentication server 152 to execute the authentication function. The authentication server 152 may communicate with the authentication function to enable/trigger the recording function on the registered user device 160. The registered user device 160 may be in close proximity of the electronic client device 158. Thus, the registered user device 160 may record the user's audio sample generated by the electronic client device 158. As a result, the electronic client device 158 may act as a first audio channel; the registered user device 160 may act as a second audio channel for the authentication process.

It should be understood that the embodiments of the registered user device 160 automatically starting recording in response to receiving a request/trigger should not be considered limiting. The registered user device 160 may provide a prompt to the user for allowing the recording functionality. For example, in response to receiving a request/trigger, the registered user device 160 may showing a graphical object (e.g., a dialog box) with the user to allow or decline a recording. The user may perform actions such as selecting an option in the graphical object, pressing a button, or providing a voice command to allow or decline the recording of the user's voice.

The user database 154 may any non-transitory machine-readable media configured to store the registered users' data. Specifically, the user database 154 may comprise the user identifier, the registered user device identifier, and the like. The user database 154 may include any other related data of the users that may be used for authentication.

After receiving an authentication request comprising the user's identifier, the authentication server 152 may access the user database 154 and retrieve a device identifier of a registered device 160 associated with the user. For example, the registered user device 160 may be a mobile phone of the user. The authentication server 152 may send a request to the electronic client device 158 to stream the generated audio file from the electronic client device 158. In the meantime, the authentication server 152 may send a request to the installed application on the registered user device 160 to stream the audio recording of the detected audio sample from the registered user device 160. The authentication function on the registered user device 160 may enable the registered user device 160 to stream the audio recording to the authentication server 152. As a result, the authentication server 152 may receive a first audio file from the electronic client device 158 and a second audio file from the registered user device 160.

It should be understood that the embodiment of the electronic client device 158 emitting an acoustic signal and the registered user device 160 capturing the acoustic signal is merely illustrative. In other embodiments, the registered user device 160 may generate the acoustic signal and the electronic client device 158 may capture the acoustic signal. In other embodiments, both the registered user device 160 and the electronic client device 158 may emit acoustic signals (e.g., at different frequencies) and both devices may capture acoustic signals emitted by the other device. As described above, the acoustic signals may be infrasonic (e.g., below 20 Hz), ultrasonic (e.g., above 20 kHz), and/or in the audible range for human beings (e.g., from 20 Hz to 20 kHz). The acoustic signals may contain, for example, a pattern, a code, portion of a song, and/or any other kind information.

When electronic client device 158 and the registered user device 160 are in close proximity to each other (e.g., located within a predetermined distance threshold), the audio files of the same audio sample on the two electronic devices may be similar. The authentication server 152 may leverage such similarity to verify the presence of the registered user device 160 at the electronic client device 158 for the issued electronic request. The registered user device 160 may act as the representative of the user: the presence of the registered user device 160 may imply the presence of the user. The authentication server 152 may authenticate the user for the request when the authentication server 152 determines that the user is present when the user issues the request by interacting with the electronic client device 158.

In operation, the authentication server 152 may determine a similarity score between the first audio file and the second audio file. The authentication server 152 may compare the similarity score with a score threshold (e.g., a predetermined value). If the similarity score satisfies the threshold, the authentication server 152 may determine the registered user device (e.g., user's mobile phone) 110 is within a distance threshold of the electronic client device 158 used by the user. Furthermore, the authentication server 152 may determine that the owner of the registered user device 160 (e.g., mobile phone), not some imposter, is present for the issued electronic request, thus authenticate the user. If the similarity score does not satisfy the threshold, the authentication server 152 may determine the user is not a trusted/registered user. The authentication server 152 may send the authentication result to the webserver 162. Based on the authentication result, the webserver 162 may either authorize the services corresponding to the user's electronic request or deny the user's electronic request.

Figure 2A:
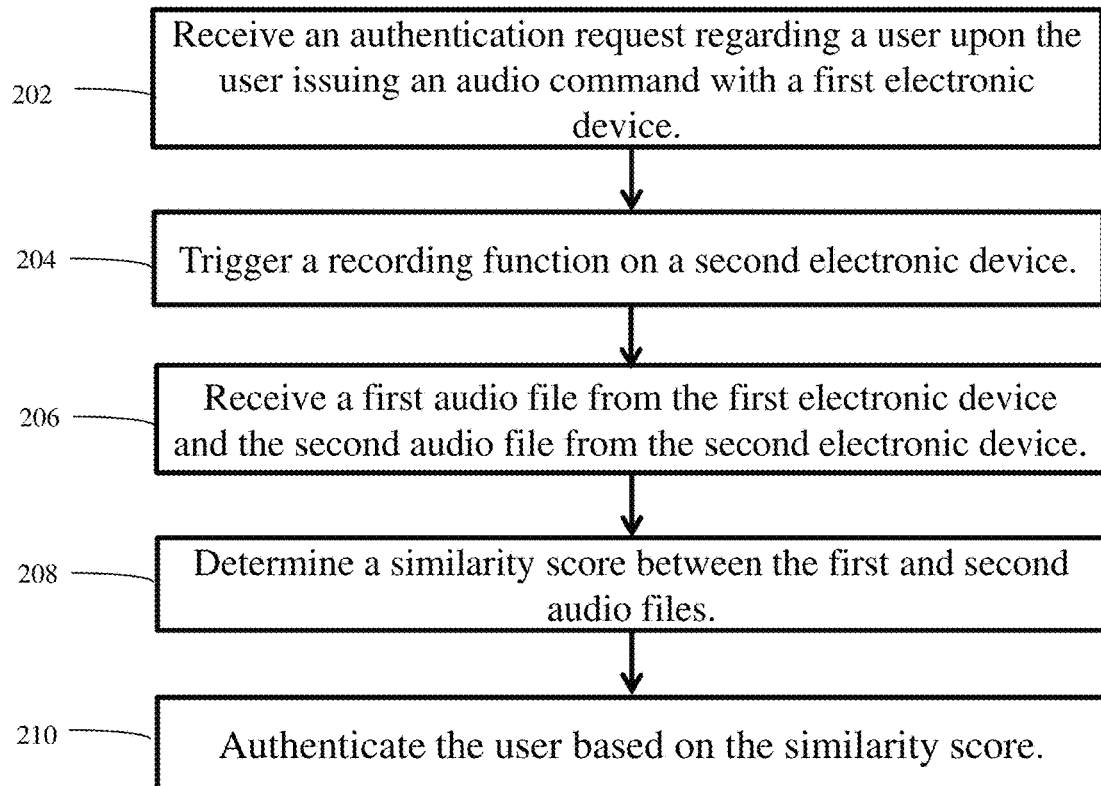
FIG. 2A shows a flowchart of an illustrative method of authenticating/enrolling a user leveraging multiple audio channels based on users' voice, according to an embodiment.

FIG. 2A shows a flowchart of an illustrative method 200A for authentication leveraging multiple audio channels based on users' audio, according to an embodiment. Other embodiments may comprise additional or alternative steps, or may omit some steps altogether.

At step 202, an authentication server may receive an authentication request regarding a user upon the user issuing an audio command by interacting with a first electronic device. For example, a user may issue an electronic request attempting to access a service by interacting with an electronic client device (e.g., a first device). The electronic request may be a login request or any other requests. The service provider's server may need to authenticate the user's identity before authorizing the requested service.

In one example, the user may issue the request by initiating a command to an IoT device, such as a voice-controlled intelligent personal assistant. The IoT devices may need to verify the command is coming from the owner/user before providing the service. For instance, the user may issue a command to the voice-controlled intelligent personal assistant "turn on the microwave oven." The voice-controlled intelligent personal assistant may need to authorize the user before performing the task, thus the voice-controlled intelligent personal assistant may send an authentication request regarding the user to the authentication server. For example, upon hearing a predetermined keyword, the voice-controlled intelligent personal assistant may send the authentication request to the authentication server. The authentication request may comprise the user's identifier (ID).

In another example, the user may issue a request by making audio commands to access a service hosted on another entity, such as a bank server or webserver. For instance, the user may make a phone call using a landline phone to a bank's call center to check his/her bank account balance. The bank's call center may need to authenticate the user before authorizing the access to account information, thus the bank's call center may send an authentication request regarding the user to the authentication server.

Upon receiving the authentication request, the authentication server may verify the user issuing the request is indeed the registered user for the corresponding service. The electronic client device used by the user to generate the electronic request may be referred to as a first electronic device. The first electronic device may therefore be the electronic client device (e.g., IoT devices) utilized by the user or the service server associated with the user devices (e.g., the call center server or the backend servers of the IoT devices). The authentication server may retrieve a second electronic device ID that is a registered device associated with the user. For example, the second electronic device may be a mobile phone of the user. The second electronic device may act as the representative of the user. The presence of the second electronic device may imply the presence of the user.

At step 204, the authentication server may trigger the recording function on the second electronic devices to record the user's audio commands. The second electronic device (e.g., registered mobile phone of the user) may have an application (e.g., an "authentication" app) installed that may enable the mobile phone to record audio samples and transmit the recorded audio files to the authentication server. Therefore, the authentication server may trigger the recording function on the second electronic device through the installed application. The authentication server may provide the trigger to the application through a REST API or a push request through iOS's APNS (Apple push notification service) message or Android's GCM (Google cloud messaging)/FCM (Firebase communication messaging) message to capture the user's audio commands. It should be understood that the aforementioned request/message protocols are merely illustrative and the request may be sent through any Internet Protocol or mobile message (e.g., SMS) channel. The first and second electronic devices (the second device through the application) may record the audio sample as a local audio file then send the audio file to the authentication server. Alternatively, the first and second devices may stream the audio sample in real time without saving it locally. The authentication function (e.g., implemented by an authentication application installed on the user's mobile phone) may require the user to register with the authentication server.

When the user is issuing the electronic request via audio commands by calling a call center or speaking to IoT devices, the authentication server may activate/trigger the recording function on the second electronic device to record the user's audio commands (or voice commands). In case of an IoT device, the recording function may capture the user's voice commands (or follow up commands) following a trigger phrase used to activate the IoT device. Alternatively, the second electronic device may be continuously listening, maintaining a buffer of a few seconds for the recorded audio. When the authentication server sends the activate/trigger command to the second electronic device, the second electronic device may transmit the recorded audio in the buffer in addition to any new recorded audio. In some embodiments, the IoT device may send a request to the user's mobile phone to stream the audio to the authentication server. As a result, the call center or the IoT devices (or the corresponding servers of the IoT devices) may receive the user's audio commands and generate a first audio file that is the audio stream or recoding of the user's audio. The second electronic device may generate a second audio file that is the audio stream or recording of the same audio (e.g., user's audio commands).

When the first electronic device and the second electronic device are in close proximity to each other (e.g., located within a predetermined distance threshold), the audio files of the same audio sample on the first and second electronic devices should be similar. The authentication server may leverage such similarity to verify the user's presence at the electronic client device (e.g., the first device) for the issued electronic request. The authentication server may authenticate the user for the request when the authentication server determines that the user is present when the user issues the request by interacting with the first electronic device.

At step 206, the authentication server may receive the first audio file (via a first audio stream) from the first electronic device and the second audio file (via a second audio stream) from the second electronic device. The authentication server may send a request to the first electronic device to stream the first audio file from the first electronic device to the authentication server. The request may be using REST (representational state transfer) API (application programming interface) or some other API. In the meantime, the authentication server may send a request to the installed application on the second electronic device. This request may be a push request using iOS's APNS message or Android's GCM/FCM message. In some embodiments the request may be through Short Message Service (SMS) or Rich Communications Services (RCS). It should be understood that the aforementioned request/message protocols are merely illustrative and the request may be sent through any Internet Protocol or mobile message (e.g., SMS) channel. The authentication function in the second electronic device may enable the second electronic device to stream the second audio file to the authentication server. If the user is not a registered user, the authentication server may decline the authentication request, and respond "user does not have an authentication function." After both the first and second electronic devices stream the audio files, the authentication server may receive the first audio file from the first electronic device and the second audio file from the second electronic device.

At step 208, the authentication server may determine a similarity score between the first audio file and the second audio file. The authentication server may compute the similarity score by comparing the two audio files against each other. The authentication server may compute the similarity score using other different methods. In a first method, when the authentication server receives the audio stream from the two channels, the authentication server may match the individual audio file against a stored voice model for the registered user. In a second method, the authentication server may take the two audio files, combine them by removing noise from both audio files, and test the combined audio file against the stored voice model. In a third method, the authentication server may extract the transcriptions from the two audio files and compare the two transcriptions to check if the two audio files have the same spoken text. The authentication server may look for certain keywords using keyword spotting techniques and compare the two transcription based on the keywords. This method may be combined with the above two methods or used by itself. In a fourth method, the mobile phone may extract features from the second audio file and send the audio features to the authentication server. The authentication server may compute the similarity score based on comparison of the audio features. In a fifth method, rather than sending plaintext features to the authentication server, the smart phone may send encrypted features to the authentication server. For example, each of the first and second audio files may be encrypted. The authentication server may compute the similarity score based on comparison in an encrypted domain. Computation of similarity score based on comparison in an encrypted domain is disclosed in U.S. patent application Ser. No. 16/035,301, incorporated herein by reference in its entirety. In a sixth method, the authentication server may send the features of the first audio file to the mobile phone. The mobile phone may compute the similarity score based upon comparing the features of the first and the second audio file at the phone and send back the result to the authentication server.

At step 210, the authentication server may authenticate the user based on the similarity score. Specifically, the authentication server may compare the similarity score with a score threshold (e.g., a predetermined value). If the similarity score satisfies the threshold, the authentication server may determine the registered mobile phone (e.g., the second device) is within a distance threshold of the device the first device used by the user. Furthermore, the authentication server may determine that the owner of the mobile phone, not some imposter, is present for the issued electronic request, thus authenticate the user. If the similarity score does not satisfy the threshold, the authentication server may determine the user is not a trusted/registered user.

The authentication server may send the authentication result to the service server, such as the call center server or the IoT devices (or backend servers of the IoT devices). Based on the authentication result, the service server may either authorize the services corresponding to the user's electronic request or deny the user's electronic request.

The authentication process is therefore automatic, seamless and frictionless. Furthermore, the authentication process is effortless from the perspective of the user who simply must have a registered device such as a programmed mobile phone, which can capture the audio sample and is in proximity to whatever device utilized by the user.

In some embodiments, the authentication process may leverage multiple channels instead of two. There is no specific requirement that the audio files from different channels have to be aligned. The same process may be used for authentication or enrollment.

Figure 2B:
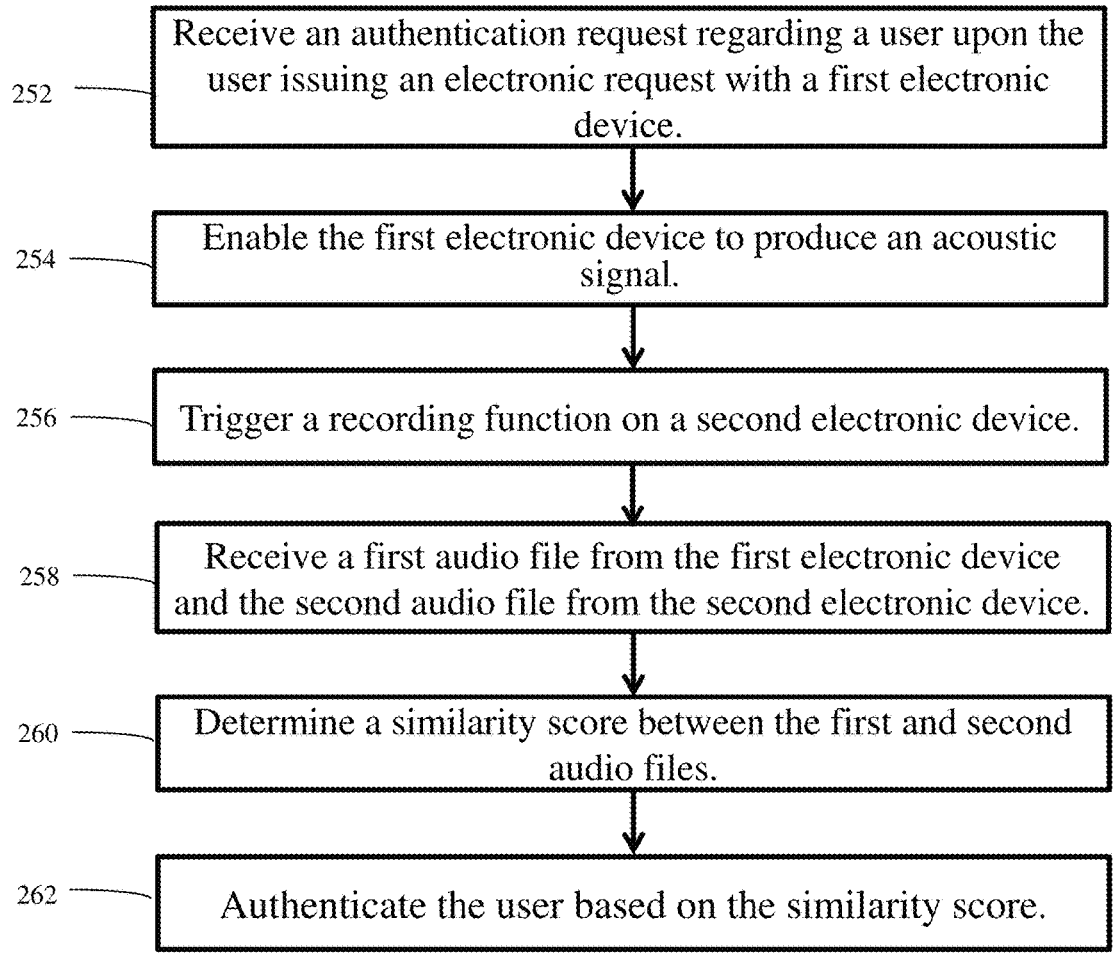
FIG. 2B shows a flowchart of an illustrative method of authenticating/enrolling a user leveraging multiple audio channels based on machine generated audio, according to an embodiment.

FIG. 2B shows a flowchart of an illustrative method 200B for authentication leveraging multiple audio channels based on machine generated audio, according to an embodiment. Other embodiments may comprise additional or alternative steps, or may omit some steps altogether.

At step 252, an authentication server may receive an authentication request regarding a user upon the user issuing an electronic request by interacting with a first electronic device. For example, a user may issue an electronic request attempting to access a service by interacting with an electronic client device (e.g., a first device). The electronic request may be a login request or any other requests. The service provider's server may need to authenticate the user's identity before authorizing the requested service.

For example, the user may issue a request by visiting a website hosted by a webserver. For example, a user may try to access his/her bank accounts to conduct an online transaction. The user may try to log into an account of the website on a laptop. The website may present a login prompt that requires the user to input account information (e.g., user identifier information). The user may use a web browser run on the electronic client device (e.g., laptop) to input account information and communicate with the webserver. The webserver may require authentication before authorizing the access. After the webserver receives the login account information, the webserver may send an authentication request regarding the user to the authentication server.

Upon receiving the authentication request, the authentication server may verify the user issuing the request is indeed the registered user for the corresponding service. The electronic client device used by the user to generate the electronic request may be referred to as a first electronic device. The first electronic device may therefore be the user's electronic client device, such as the laptop the user uses for logging into the bank account. The authentication server may retrieve a second electronic device ID that is a registered device associated with the user. For example, the second electronic device may be a mobile phone of the user. The second electronic device may act as the representative of the user. The presence of the second electronic device may imply the presence of the user.

At step 254, the authentication server may enable the first electronic device to produce an acoustic signal. When the user is issuing the electronic request via inputting account information on a website, the authentication server may enable the electronic client device (e.g., the first electronic device) utilized by the user to produce an audio sample, for example, emitting an acoustic signal that is detectable by the user's mobile phone (e.g., the second electronic device). The acoustic signals may be infrasonic (e.g., below 20 Hz), ultrasonic (e.g., above 20 kHz), and/or in the audible range for human beings (e.g., from 20 Hz to 20 kHz). The authentication server may collaborate with the webserver to authenticate the user. Specifically, the authentication server may request the webserver to instruct the electronic client device to produce the audio sample, such as the acoustic signal. In operation, the website may prompt the user to enter a user name and password, personal identification number (PIN), and the like. Thereafter, the website or webserver may pursue to verify the user's identity for second factor authentication. The website or webserver may instruct the electronic client device to produce the acoustic signal. In some instances, the user may enter only a user name or an account number. The user may not have to enter a password or a PIN and the acoustic signal without a password or a PIN may be used for authentication.

At step 256, the authentication server may trigger the recording function on the second electronic device to record the acoustic signal using an installed application. The second electronic device (e.g., registered mobile phone of the user) may have an application (e.g., an "authentication" application) installed that enables the mobile phone to record audio samples (e.g., acoustic signal) and transmit the recorded audio files to the authentication server. The authentication server may provide the trigger to the application through a REST API or a push request through iOS's APNS message or Android's GCM/FCM message to capture the acoustic signal. It should be understood that the aforementioned request/message protocols are merely illustrative and the request may be sent through any Internet Protocol or mobile message (e.g., SMS) channel.

When triggered, the application may access the recording function on the user's mobile phone to record the acoustic signal from the electronic client device. As a result, the first electronic device may generate a first audio file that is the audio stream or recording of its produced acoustic signal. The second electronic device may, through the application, generate a second audio file that is the audio stream or recording of the acoustic signal produced by the first electronic device and captured by the second electronic device.

The first and second electronic devices may record the acoustic signal as a local audio file then send the audio file to the authentication server. Alternatively, the first and second devices may stream the audio sample (e.g., acoustic signal) in real time without saving it locally. The authentication function (e.g., implemented by an authentication application installed on the user's mobile phone) may require the user to register with the authentication server.

At step 258, the authentication server may receive the first audio file from the first electronic device and the second audio file from the second electronic device. The authentication server may send a request to the first electronic device to stream the first audio file from the first electronic device to the authentication server. The request may be using REST API or some other API. In the meantime, the authentication server may send a request to the installed application on the second electronic device. This request may be a push request using iOS's APNS message or Android's GCM/FCM message. In some embodiments the request may be through SMS or RCS. It should be understood that the aforementioned request/message protocols are merely illustrative and the request may be sent through any Internet Protocol or mobile message (e.g., SMS) channel. The authentication function in the second electronic device may enable the second electronic device to stream the second audio file to the authentication server. If the user is not a registered user, the authentication server may decline the authentication request, and respond "user does not have an authentication function." After both the first and second electronic devices stream the audio files, the authentication server may receive the first audio file from the first electronic device and the second audio file from the second electronic device.

At step 260, the authentication server may determine a similarity score between the first audio file and the second audio file. The authentication server may compute the similarity score by comparing the two audio files against each other. The authentication server may compute the similarity score using other different methods. In a first method, when the authentication server receives the audio stream from the two channels, the authentication server may match the individual audio file against a stored voice model for the registered user. In a second method, the authentication server may take the two audio files, combine them by removing noise from both audio files, and test the combined audio file against the stored voice model. In a third method, the authentication server may extract the transcriptions from the two audio files and compare the two transcriptions to check if the two audio files have the same spoken text. This method may be combined with the above two methods or used by itself. In a fourth method, the authentication server may extract certain keywords using keyword spotting techniques and compare the two transcription based on the keywords. For example, the authentication server may extract a first set of keywords from the first file, and a second set of keywords from the second file. The authentication server may compare the two audio files by comparing the two sets of keywords to calculate the similarity score. In a fifth method, the mobile phone may extract features from the audio files and send the audio features to the authentication server. The authentication server may compute the similarity score based on comparison of the audio features. In a sixth method, rather than sending features to the authentication server, the smart phone may send encrypted features to the authentication server. For example, each of the first and second audio files may be encrypted. The authentication server may compute the similarity score based on comparison in an encrypted domain. Computation of similarity score based on comparison in an encrypted domain is disclosed in U.S. patent application Ser. No. 16/035,301, incorporated herein by reference in its entirety. In a seventh method, the authentication server may send the features of the first audio file to the mobile phone. The mobile phone may compute the similarity score at the phone and send back the result to the authentication server.

At step 262, the authentication server may authenticate the user based on the similarity score. Specifically, the authentication server may compare the similarity score with a score threshold (e.g., a predetermined value). If the similarity score satisfies the threshold, the authentication server may determine the registered mobile phone (e.g., the second device) is within a distance threshold of the device (e.g., the first device) used by the user. Furthermore, the authentication server may determine that the owner of the mobile phone, not some imposter, is present for the issued electronic request, thus authenticate the user. If the similarity score does not satisfy the threshold, the authentication server may determine the user is not a trusted/registered user.

The authentication server may send the authentication result to the webserver. Based on the authentication result, the webserver may either authorize the services corresponding to the user's electronic request or deny the user's electronic request.

The authentication process is automatic, seamless and frictionless. Furthermore, the authentication process is effortless from the perspective of the user who simply must have a registered device such as a programmed mobile phone, which can capture the audio sample and is in proximity to the device utilized by the user.

In some embodiments, the authentication process may leverage multiple channels instead of two. There is no specific requirement that the audio files from different channels have to be aligned. The same process may be used for authentication or enrollment.

Figure 3:
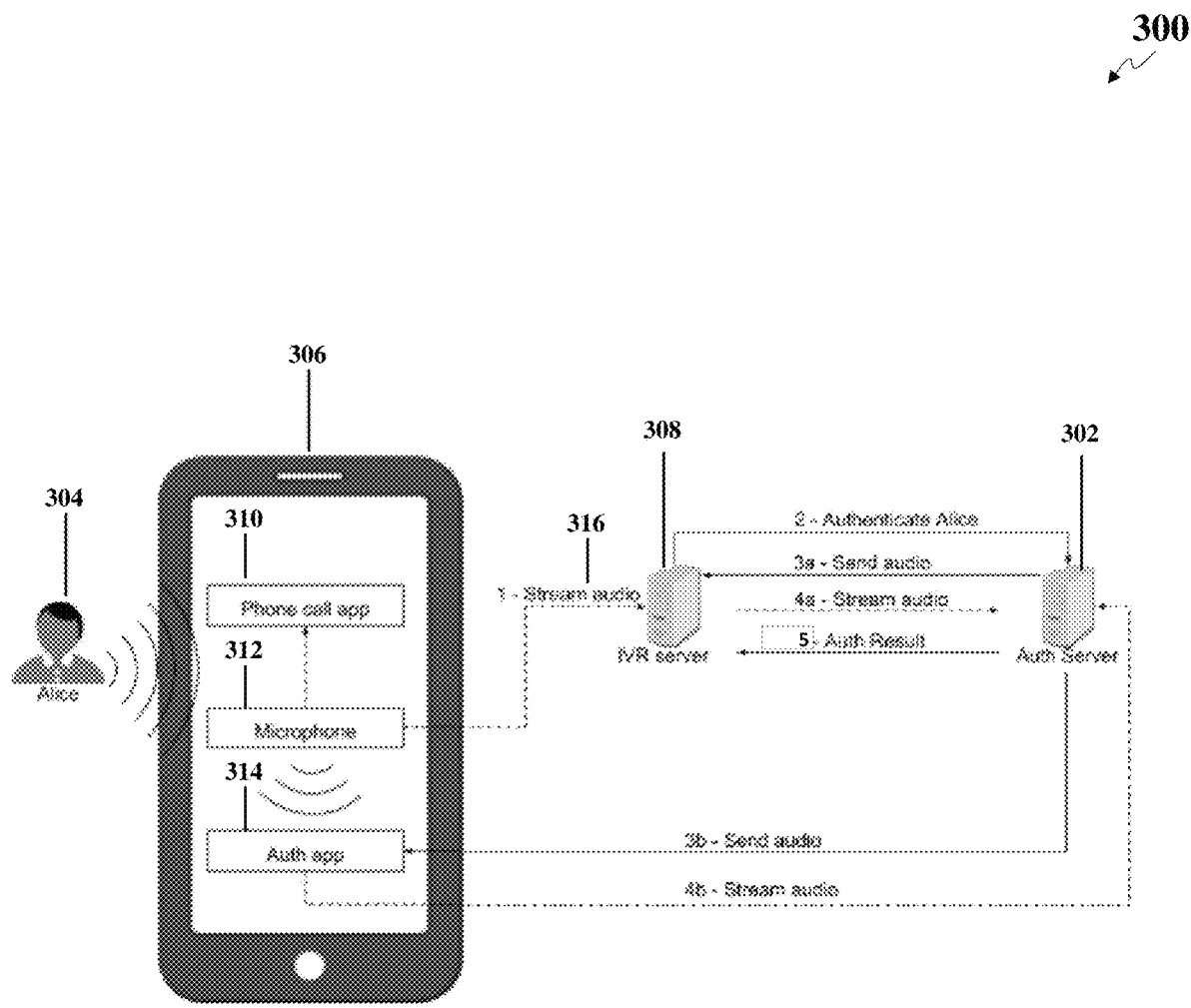
FIG. 3 shows an illustrative process of authentication over a phone call to a call center, according to an embodiment.

FIG. 3 shows an illustrative process 300 of authentication over a phone call to a call center, according to an embodiment. An authentication server 302 may authenticate a user 304 using two channels voice authentication system while the user ("Alice") 304 is making a call to a call center server, such as IVR server 308. Specifically, in step 1, user Alice 304 may dial the phone number of a bank's call center from her mobile phone 306 using a phone call app 310. Once the call is connected, Alice 304 may enter the account number or any identification number. After the call center server 308 verifies the account number, the microphone 312 of Alice's mobile phone 306 captures Alice's voice and continuously streams the captured audio recording from Alice's mobile phone 306 to the IVR server 316, which is the call center server. Thereafter, in step 2, the call center server (e.g., IVR server) 308 sends an authentication request to the authentication server 302 to verify Alice's identity for second factor authentication. In some embodiments, the call center server 308 and the authentication server 302 may be combined to one single server.

The authentication server 302 checks whether Alice is a registered user of the "authentication function" 314 (e.g., implemented by an authentication application installed in Alice's phone 306) or not. If yes, the authentication server 302 sends a request to the call center server 308 in step 3*a* and the authentication function 314 on Alice's phone 306 in step 3*b* to stream the audio from the mobile phone 306. If no, the authentication server 302 declines the request and responds "Alice does not have an authentication function" or some other proper statement. The authentication server 302 may send the request to the call center server using REST API or some other API in step 3*a*. The authentication server 302 may send the request to the authentication function 314 as a push request using iOS's APNS message or Android's GCM/FCM message in step 3*b*. In some embodiments the request may be through SMS or RCS. It should be understood that the aforementioned request/message protocols are merely illustrative and the request may be sent through any Internet Protocol or mobile message (e.g., SMS) channel. In some instances, the authentication function 314 may detect the dialed phone number is to a bank call center and may automatically start recording without receiving a request from the authentication server 302. The call center server 308 (in step 4*a*) and the authentication function 314 (in step 4*b*) start to stream their audio files to the authentication server 302. In the instances where the authentication function 314 automatically starts recording prior to receiving the request, the audio file from the authentication function 314 may include the user's voice recorded by the authentication function 314 before the authentication function 314 receives a communication from the authentication server 302. After receiving the audio files, the authentication server 302 matches the two audio files and determines whether the audio files are similar or not. If similar, the authentication server 302 determines Alice 304 is authenticated and the authentication result being positive; otherwise, the authentication server determines Alice 304 is not authenticated the authentication result being negative. The authentication server 302 sends the authentication result to the call center server 308 in step 5. Upon receiving the authentication result, the call center server 308 approves or rejects Alice's request.

Figure 4:
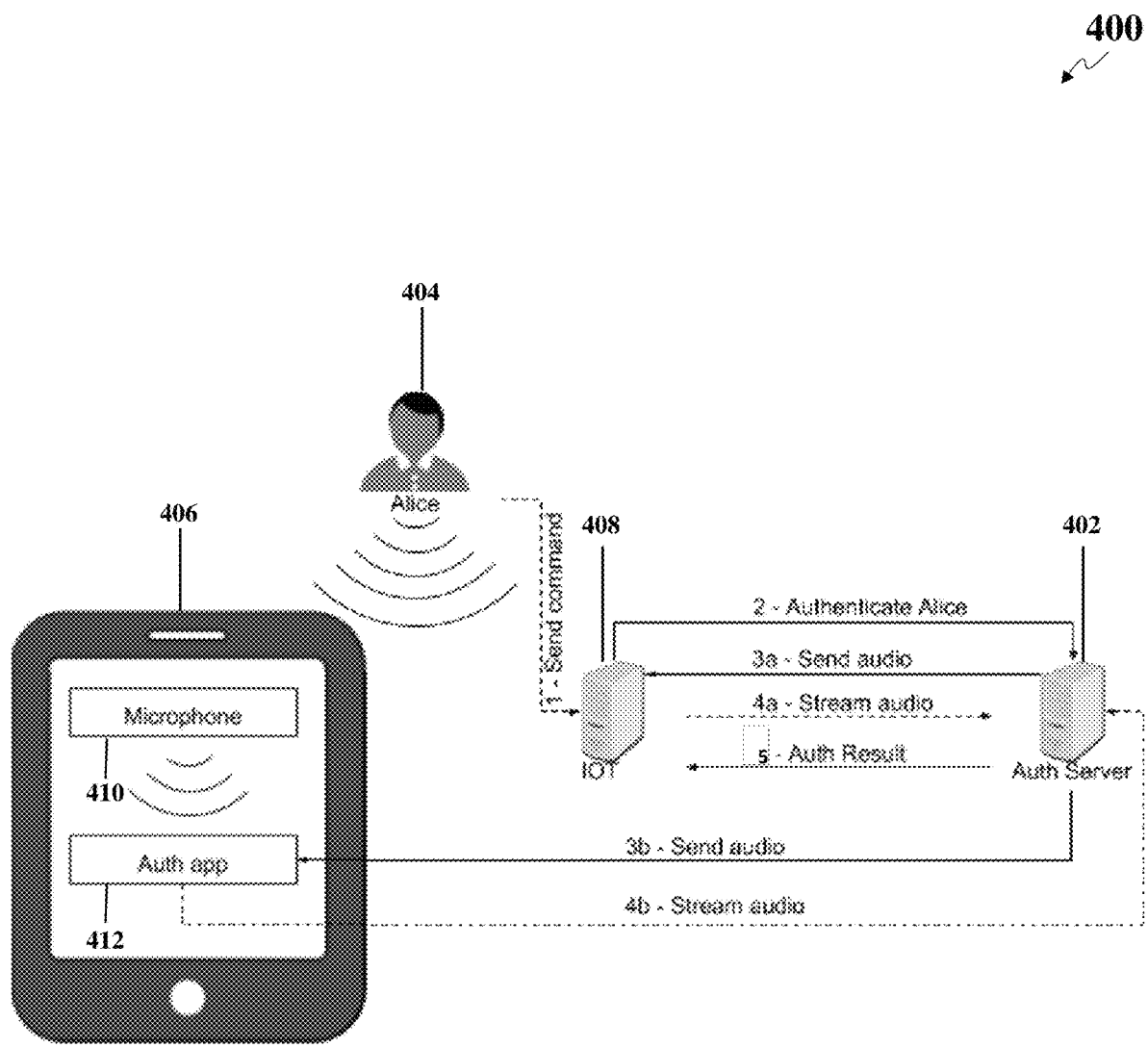
FIG. 4 shows an illustrative process of authentication to an IoT device, according to an embodiment.

FIG. 4 shows an illustrative process 400 of authentication to an IoT device, according to an embodiment. An authentication server 402 may authenticate a user (e.g., Alice) 404 when the user sends a command to an IoT device 408 (e.g., a voice-controlled intelligent personal assistant) to unlock his/her car. In such a case, second factor authentication may be necessary. Voice may be a weak authentication mechanism for unlock a car. Therefore, authentication of a user's identify should be complemented with a second factor authentication without increasing complexity in the protocol and hampering usability.

The authentication process works similar as in the example of FIG. 3 with the following exception. In the first step (step 1), Alice 404 talks to a voice enabled IoT device 408 to issue a request. For example, Alice issues a command "turn on the microwave oven." Upon hearing the command or a predetermined keyword, the IoT device 408 sends a request to the authentication server 402 to authenticate Alice 404 in step 2. The authentication function 412 (e.g., implemented by an authentication application installed on Alice's mobile phone 406) may enable the microphone 412 of Alice's mobile phone 406 to capture Alice's voice.

The authentication server 402 sends a request to the IoT device 408 to stream the audio from the IoT device 408 in step 3a. In addition, the authentication server 402 sends a request to the authentication function 412 on Alice's phone 406 to stream the audio from the mobile phone 406 in step 3b. The IoT device 408 (in step 4a) and the authentication function 412 (in step 4b) start to stream their audio files to the authentication server 402. After receiving the audio files, the authentication server 402 matches the two audio files and determines whether the audio files are similar or not. If similar, the authentication server 402 determines Alice 404 is authenticated and the authentication result being positive; otherwise, the authentication server determines Alice is not authenticated the authentication result being negative. The authentication server 402 sends the authentication result to the IoT device 408 in step 5. Upon receiving the authentication result, the IoT device 408 approves or rejects Alice's request.

Figure 5:
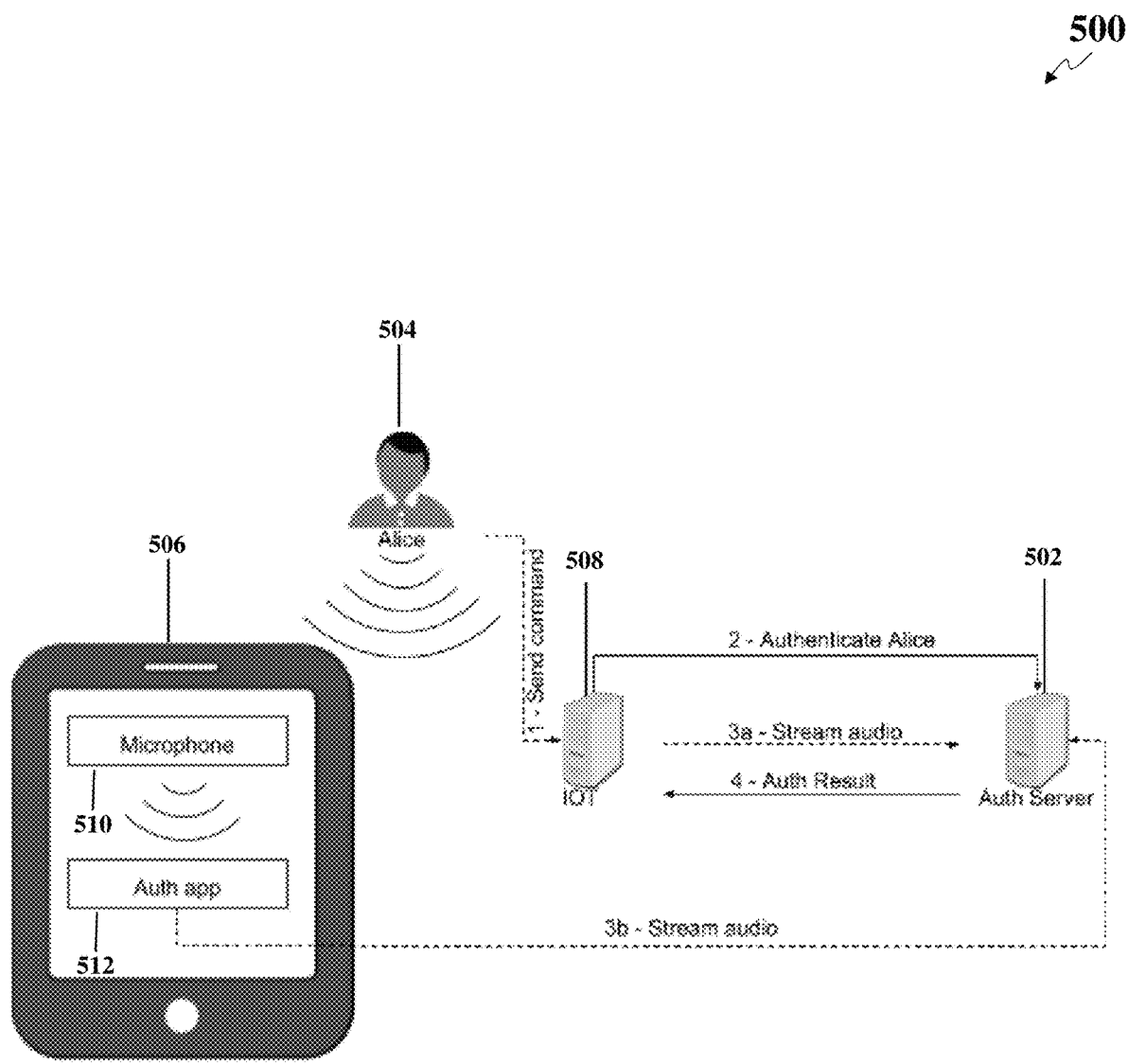
FIG. 5 shows another illustrative process of authentication to an IoT device, according to an embodiment.

FIG. 5 shows an illustrative process 500 of authentication to an IoT device, according to an embodiment. In this example, the user's (e.g., Alice 504) phone 506 also wakes up after Alice 504 speaks a predetermined keyword. In the first step (step 1), Alice 504 talks to a voice enabled IoT device (say, a voice-controlled intelligent personal assistant) 508 to issue a request. For example, Alice issues a command "turn on the microwave oven." Upon hearing the command, the voice-controlled intelligent personal assistant 508 sends a request to the authentication server 502 to authenticate Alice 504 in step 2.

The IoT device 508 (in step 3a) and an authentication function 512 (in step 3b) start to stream their audio files to the authentication server 502. The authentication function 512 may be implemented by an authentication application installed on Alice's mobile phone 506. Upon hearing the voice command and/or a predetermined keyword, the IoT device 508 and Alice's phone 506 sends a POST API request to the authentication server 502 with the audio stream. After receiving the audio files, the authentication server 502 matches the two audio files and determines whether the audio files are similar or not. If similar, the authentication server 502 determines Alice 504 is authenticated and the authentication result being positive; otherwise, the authentication server determines Alice is not authenticated the authentication result being negative. The authentication server 502 sends the authentication result to the IoT device 508 in step 4. Upon receiving the authentication result, the IoT device 508 approves or rejects Alice's request.

In some embodiments, the user's phone is always in the listening mode and maintains a buffer for a few seconds. For example, Alice issues a command "turn on the microwave oven." Upon hearing or a predetermined keyword, phrase, or the entire sentence of the command, the IoT device sends a request to Alice's phone to stream the audio to the authentication server.

In some embodiments, a user may authenticate him/herself to a remote party in front of a notary public or a trusted third party. A notary public may be a person or an entity with a trusted or pre-authenticated electronic device such as a mobile phone. There are three audio channels: the first channel is the IoT device or call center server (e.g., an IVR server) to which the user is talking; the second channel is the user's trusted mobile phone device; and the third channel is a notary public mobile phone or compatible device. In the event of authentication, the authentication server may collect the audio from the IoT device/call center server along with user's mobile phone and the notary public's mobile phone.

In some other embodiments, the authentication may use playback from an IoT device, according to an embodiment. For example, once the user issues a voice command to the IoT device, the user gets a voice response for confirmation. For example, the user issues the command "Please transfer $1000 from my account to XXX account." The IoT device sends a request to the mobile phone to listen. The IoT device also responds back by say "would you like to proceed with the transaction ID: 2378457435." If the audio captured by the mobile phone is the same or similar to the audio played by the IoT device, the authentication server determines the user's device is near to the IoT device and the user is authenticated.

Figure 6:
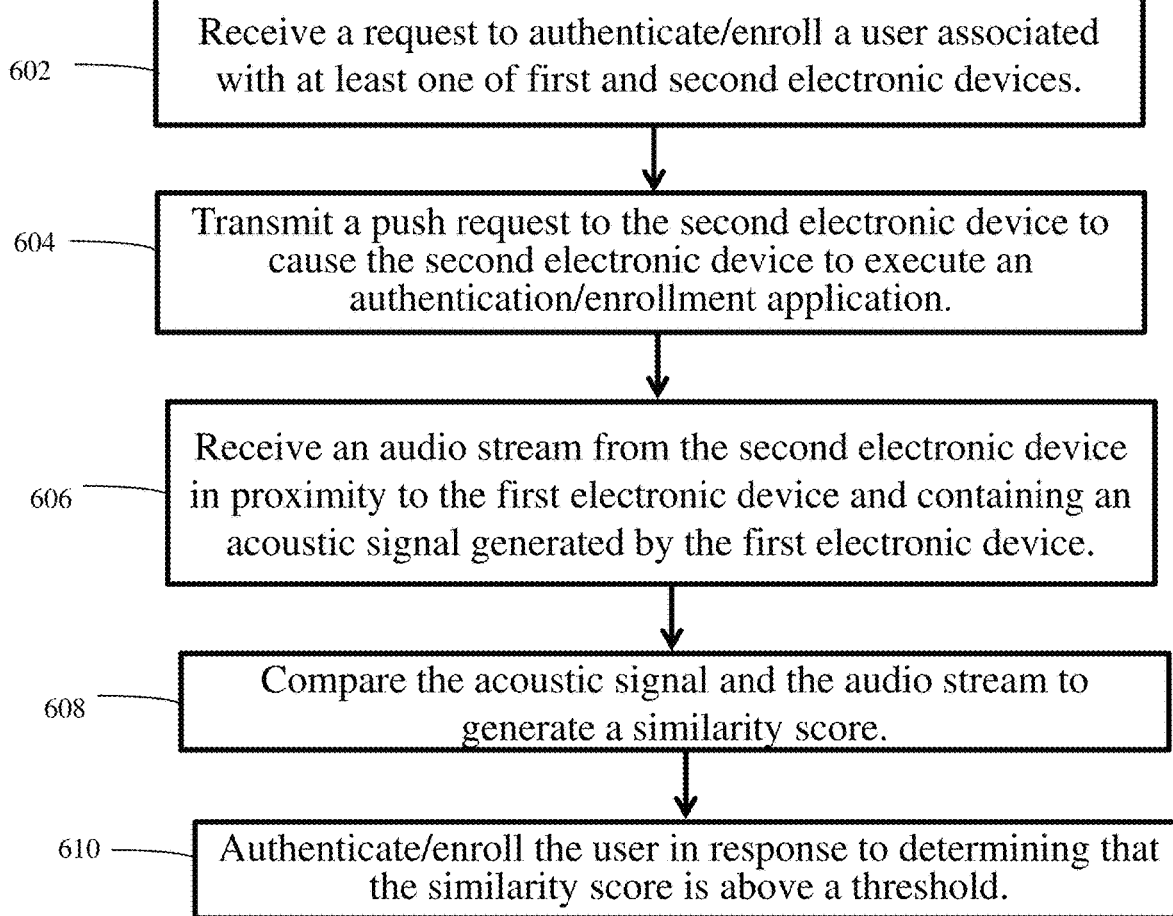
FIG. 6 shows a flow diagram of an illustrative method of leveraging multiple audio channels for authentication or enrollment, according to an embodiment.

FIG. 6 shows a flow diagram of an illustrative method 600 of authenticating or enrolling a user leveraging multiple audio channels, according to an embodiment. The steps of the method 600 are merely illustrative and additional steps, alternative steps, and lesser number of steps should be considered to be within the scope of this disclosure.

The method may begin at step 602, where a server may receive a request to authenticate or enroll a user associated with at least one of a first electronic device and a second electronic device. For example, a first electronic device may be a laptop with a web-browser using which the user is attempting to log into or enroll into a bank's website. The second electronic device may be the user's mobile phone. In response to user's login attempt, a webserver associated with a bank may transmit an authentication or an enrollment request.

At step 604, the server may transmit a push request to the second electronic device to cause the second electronic device to execute an authentication or an enrollment application. Continuing with the above example, the authentication or the enrollment application may be a mobile app (e.g., an iOS app or an Android app) associated with the bank. Alternatively, the authentication or the enrollment application may be associated with the server to provide the authentication or enrollment functionality.

At step 606, the server may receive an audio stream from the second electronic device in proximity to the first electronic device and containing an acoustic signal generated by the first electronic device. In response to the authentication or the enrollment request, the server may cause the first electronic device to generate an acoustic signal and trigger the corresponding authentication or enrollment application to listen to the acoustic signal and generate the audio stream.

At step 608, the server may compare the acoustic signal and the audio stream to generate a similarity score. For example, the server may compare the transcription of the audio stream with a transcription of the acoustic signal. As another example, the server may compare various samples of audio in the audio stream to samples of audio in the acoustic signal.

At step 610, the server may authenticate or enroll the user in response to determining that the similarity score is above a threshold. The similarity score above a threshold may indicate to the server that the audio stream may contain the acoustic signals generated by the first electronic device and picked up by the second electronic device. Therefore a higher similarity score may indicate that the first and second electronic devices are proximate to each other.

Figure 7:
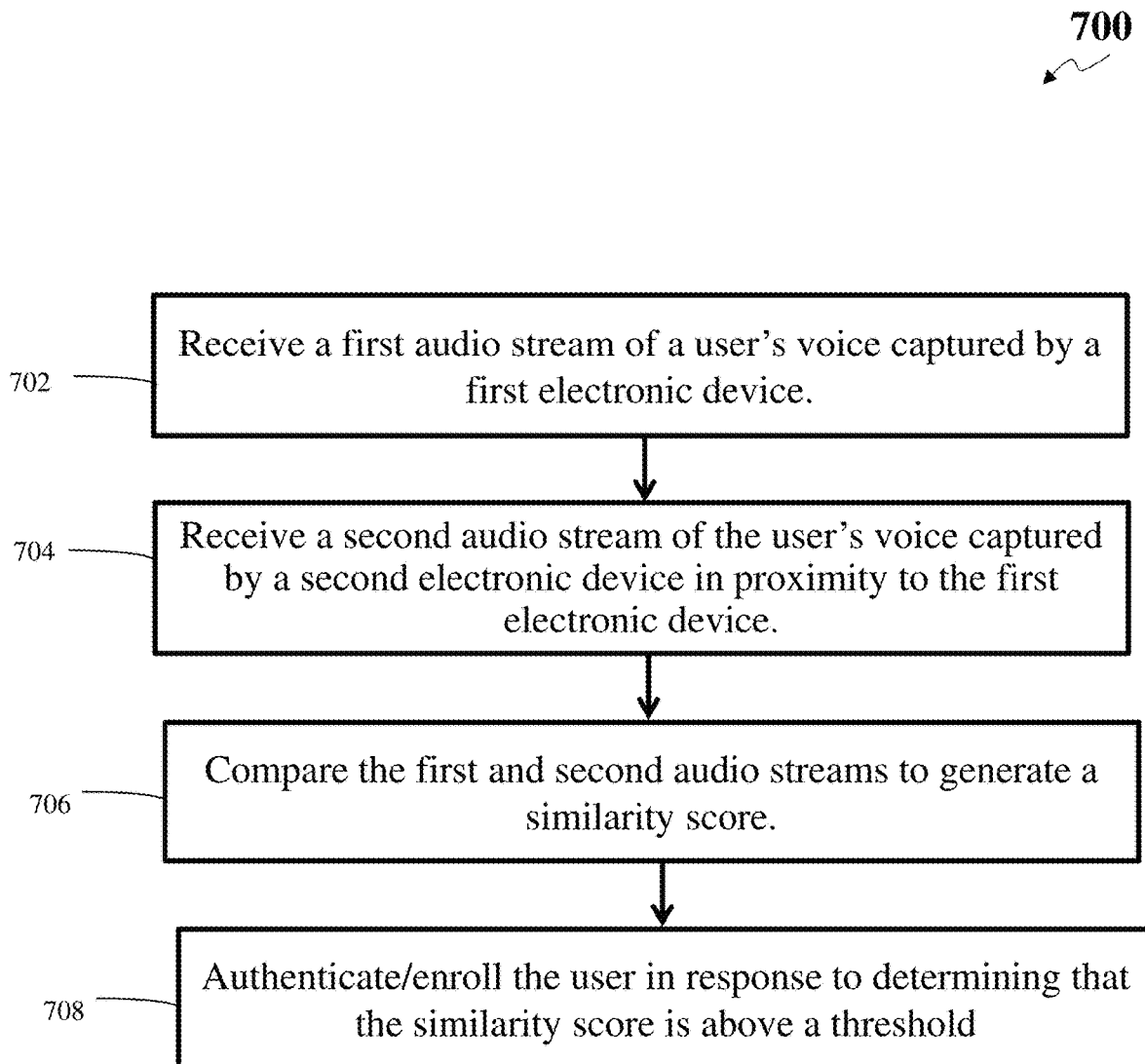
FIG. 7 shows a flow diagram of an illustrative method of leveraging multiple audio channels for authentication or enrollment, according to an embodiment.

FIG. 7 shows a flow diagram of an illustrative method 700 of authenticating or enrolling a user leveraging multiple audio channels, according to an embodiment. The steps of the method 700 are merely illustrative and additional steps, alternative steps, and lesser number of steps should be considered to be within the scope of this disclosure.

The method may begin at step 702, where a server may receive a first audio stream of a user's voice captured by a first electronic device. For example, the first electronic device may be an IoT device (e.g., a smart speaker) and the user may have issued a voice command to the IoT device.

At step 704, the server may receive a second audio stream of the user's voice captured by the second electronic device in proximity to the first electronic device. The second electronic device, for example, may be the user's mobile phone. When the user issues a command voice command to the IoT device, the server or the IoT device may trigger the mobile phone to start listening to the user's voice such that both the IoT device and the mobile phone may transmit audio streams (e.g., the first and second audio streams) of the user's voice to the server.

At step 706, the server may compare the first and second audio streams to generate the similarity score. The similarity score may indicate a likelihood that the first electronic device and the second electronic device captured the user's voice at the same time. The server may compare the speech to text version of voice samples in the first and second audio streams. The server may also compare the voice samples in the first and second audio streams against each other. In some embodiments, the server may compare the voice samples in the first and second audio streams against a stored voice model. In other embodiments, the server may merge voice samples from the first and second audio streams into one and compare the merged voice samples against a stored model. The server may also perform the comparison in an encrypted domain.

At step 708, the server may authenticate or enroll the user in response to determining that the similarity score is above a threshold. A higher similarity score may indicate that the user is proximate to each of the first and second electronic devices. When the user is authenticated, the server may provide an instruction to the first electronic device to execute a voice command provided in the user's voice.

Figure 8:
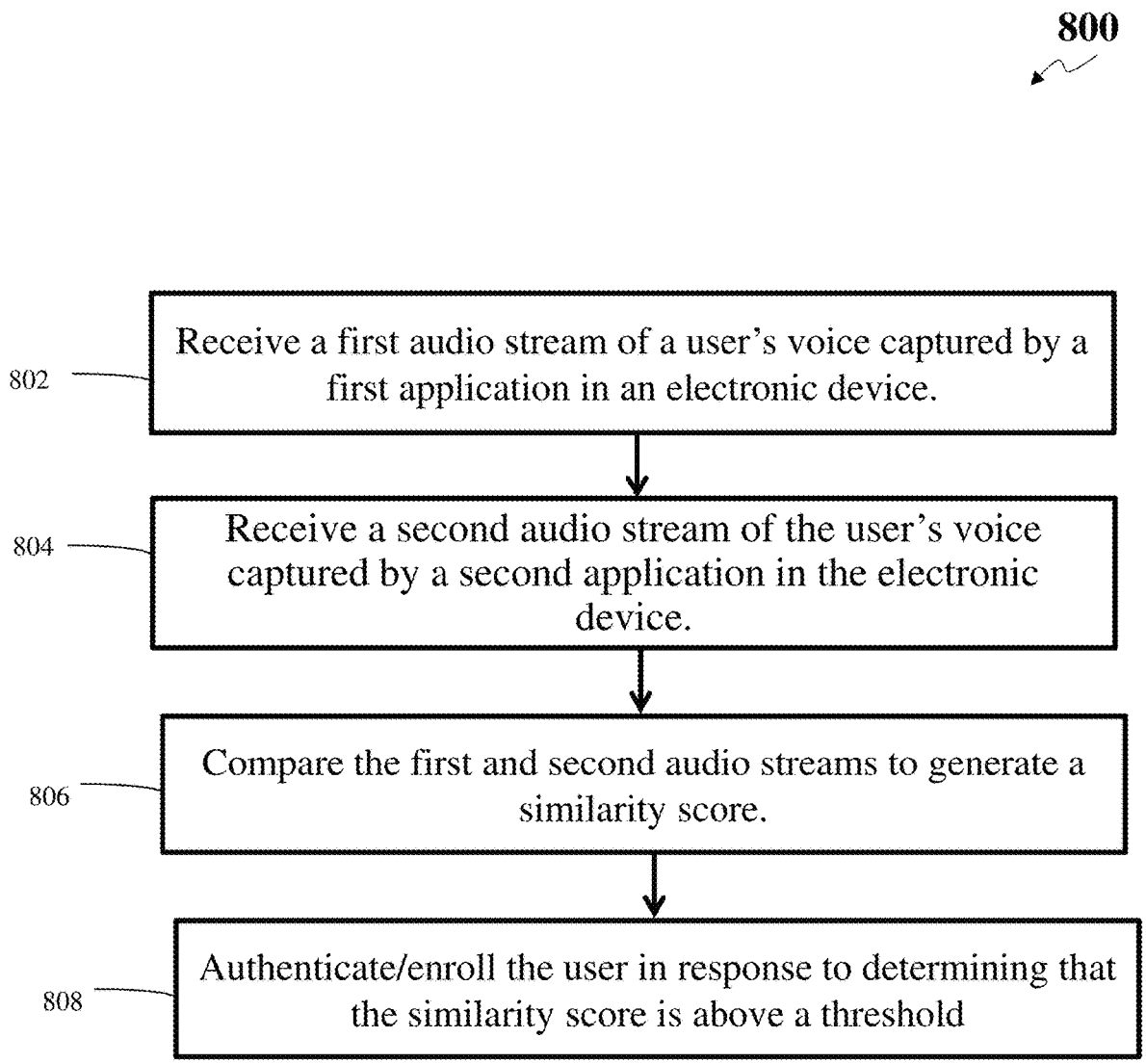
FIG. 8 shows a flow diagram of an illustrative method of leveraging multiple audio channels for authentication or enrollment, according to an embodiment.

FIG. 8 shows a flow diagram of an illustrative method 800 of authenticating or enrolling a user leveraging multiple audio channels, according to an embodiment. The steps of the method 800 are merely illustrative and additional steps, alternative steps, and lesser number of steps should be considered to be within the scope of this disclosure.

The method may begin at step 802, where a server may receive a first audio stream of a user's voice captured by a first application in an electronic device. For example, the electronic device may be a mobile phone and the first application may be the phone application in the mobile phone.

At step 804, the server may receive a second audio stream of the user's voice captured by the second application in the electronic device. The second application may be an authentication application (implementing an authentication function) or an enrollment application that the server may have triggered via a push request.

At step 806, the server may compare the first and second audio streams to generate the similarity score. The similarity score may indicate a likelihood that the first application and the second application captured the user's voice at the same time. The server may compare the speech to text version of voice samples in the first and second audio streams. The server may also compare the voice samples in the first and second audio streams against each other. In some embodiments, the server may compare the voice samples in the first and second audio streams against a stored voice model. In other embodiments, the server may merge voice samples from the first and second audio streams into one and compare the merged voice samples against a stored model. The server may also perform the comparison in an encrypted domain.

At step 808, the server may authenticate or enroll the user in response to determining that the similarity score is above a threshold. A higher similarity score may indicate that both the first application and the second application are installed in the same electronic device and that the user may not be spoofing a device or a phone number.

Figure 9:
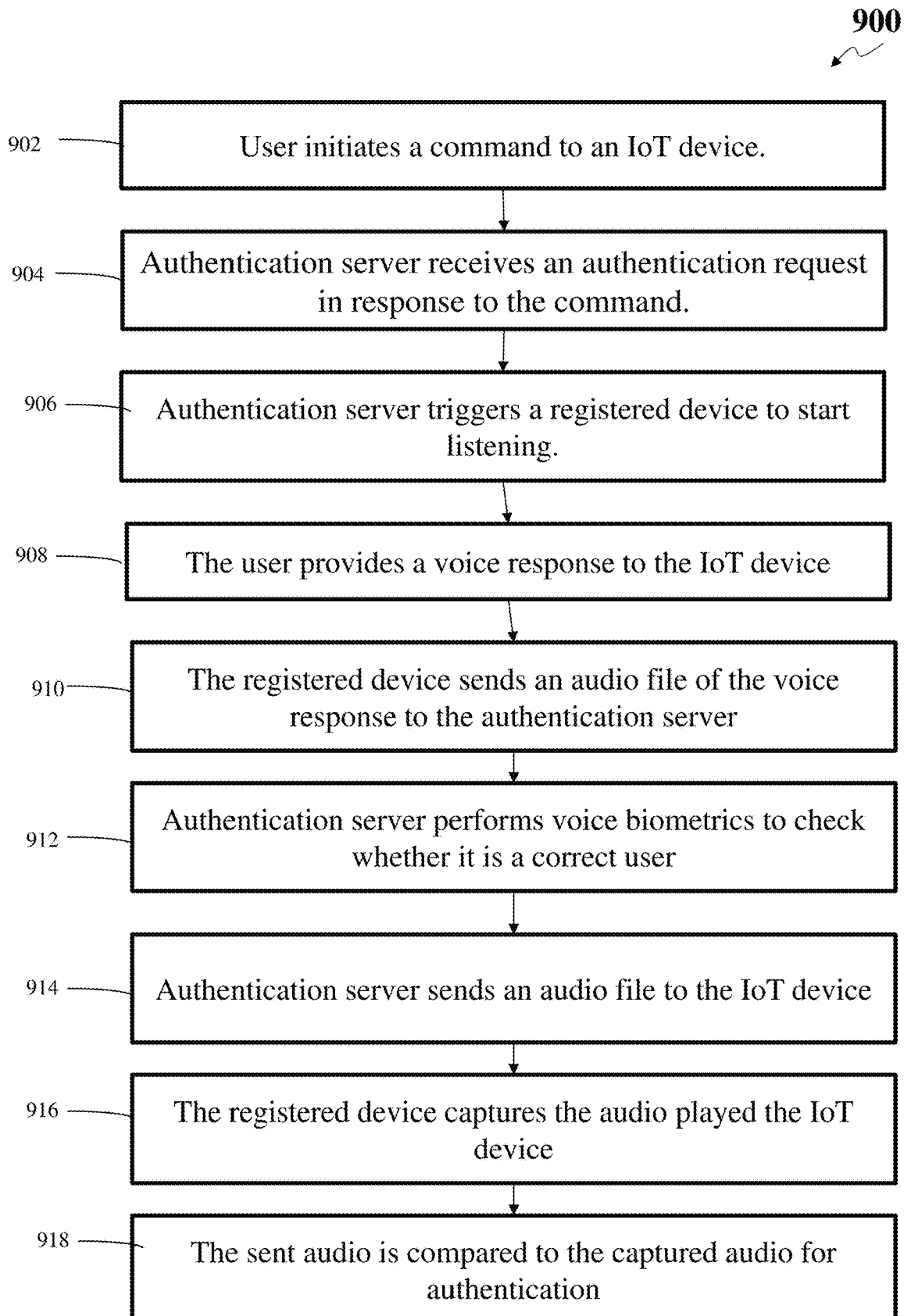
FIG. 9 shows a flow diagram of an illustrative method of leveraging multiple audio channels for authentication, according to an embodiment.

FIG. 9 shows a flow diagram of an illustrative method 900 of authenticating a user leveraging multiple audio channels, according to an embodiment. The steps of the method 900 are merely illustrative and additional steps, alternative steps, and lesser number of steps should be considered to be within the scope of this disclosure. Furthermore, it should be understood that the various components (e.g., IoT device, authentication server) executing the steps of the method 900 are merely illustrative and should not be considered limiting.

The method may begin at step 902 where a user may initiate a command to an IoT device. For example, the IoT device may be a voice-controlled intelligent personal assistant and the user may utter a trigger phrase and the command for the IoT device to execute. A command may be, for example, "Open my smart lock."

At a next step 904, an authentication server may receive an authentication request in response to the user initiating the command. A back-end server associated with the IoT device may receive the user's initiated command and determine that the user may have to be authenticated before the command is executed. Based on the determination, the back-end server may transmit the authentication request to the authentication server. The authentication server may include a device ID and/or a user ID associated with the IoT device.

At a next step 906, the authentication server may trigger a registered device to start listening. To do so, the authentication server may first retrieve an address of the registered device using the device ID and/or the user ID. The authentication server may then transmit a request to an authentication function in the registered device. The request may be through an APNS/GCM/FCM message or through SMS/

RCS channels. The authentication function may execute the authentication operations on the registered device (or any other client device) described throughout this disclosure. The request may include a trigger for the registered device to start listening (or to turn the microphone on).

At a next step 908, the user may provide a voice response to the IoT device. The voice response may be for a prompt or a question presented by the IoT device in response to the command. Continuing with the above illustrative command of "Open my smart lock," the IoT device may respond to the command with a question "What can I do for you?" In response the user may provide the voice response such as "Unlock the front door please."

At a next step 910, the registered device an audio file of the voice response to the authentication server. The registered device may send the audio file through the Internet or any other communication network. The audio file may include audio stream in real-time, raw audio of the user's voice, any artifact extracted from the audio (e.g., i-vectors), and/or a transcription (e.g., text-to-speech) of the voice response.

At a next step 912, the authentication server may perform voice biometrics to check whether it is a correct user. To perform the voice biometrics, the authentication server may extract a plurality of features (e.g., i-vectors) from the received audio file. The authentication server may use a machine learning model to generate a voiceprint from the plurality of features. The authentication server may then compare the generated voiceprint against stored voiceprint of the user. If the generated voiceprint is similar to the voiceprint of the user, the authentication server may generate an indication that the user is the correct user. In some embodiments, the authentication server may perform a text to speech comparison. For the text to speech comparison, the authentication server may compare the text of the user's voice received from the IoT device with the text of the user's voice captured by the registered device. In the embodiments where the extracted features (e.g., i-vectors, voiceprint, and/or transcription) are included in the audio file, the authentication server may further process the extracted features. It should therefore be understood that the processing of the user's voice response may be shared by the registered device and the authentication server with the audio file including the features processed/generated by the registered device.

At a next step 914, the authentication server may transmit an audio file to the IoT device. The audio file may be configured to be played by the IoT device. The audio file may include an audio one-time password (OTP). The OTP may be a sequence of audio patterns. In response to receiving the audio file, the IoT device may play the audio file. The output of the playback may be ultrasonic, infrasonic, or human audible. At a next step 916, the registered device may capture the audio played by the IoT device.

At a next step 918, the sent audio (e.g., sent from the authentication server) is compared to the captured audio for authentication. The comparison may be performed by the authentication server or locally at the registered device. If the comparison results a match above a predetermined threshold, then an indication is generated that the IoT device, the registered device, and the user are proximate to each other.

It should be understood that some steps of the illustrative method 900 may be skipped without deviating from the scope of this disclosure. For example, the authentication server may perform voiceprint comparison or the text to speech comparison and not generate the audio OTP. In other embodiments, the authentication server may rely on the assumption that the IoT device is known and therefore trusted and perform the audio OTP without performing the voiceprint or the text to speech comparison.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A computer-implemented method comprising:
   receiving, by a server, a first request to authenticate a user from a second server, the first request being generated by the second server in response to receiving a voice command at a second electronic device;
   generating and transmitting, by the server, a second request to a first electronic device in proximity to the second electronic device causing the first electronic device to execute an authentication function;
   transmitting, by the server, a third request to the second server to cause the second electronic device to play an acoustic signal;
   receiving, by the server, an audio file from the first electronic device in proximity to the second electronic device, wherein the audio file contains the acoustic signal played by the second electronic device and captured by the authentication function in the first electronic device;
   comparing, by the server, the acoustic signal and the audio file to generate a similarity score; and
   authenticating, by the server, the user in response to the server determining that the similarity score is above a threshold.

2. The method of claim 1, wherein the acoustic signal is at least one of infrasonic, ultrasonic, and audible signal.

3. The method of claim 1, further comprising:
   receiving, by the server, the acoustic signal in an encrypted form from the second server;
   receiving, by the server, the audio file in an encrypted form from the first electronic device; and
   comparing, by the server, the acoustic signal and the audio file in an encrypted domain to generate the similarity score.

4. The method of claim 1, further comprising:
   transmitting, by the server, the second request to the first electronic device through a representational state transfer application programming interface.

5. The method of claim 1, further comprising:
   transmitting, by the server, the second request to the first electronic device through at least one of Internet Protocol channel or a mobile message channel.

6. The method of claim 1, wherein comparing the acoustic signal and the audio file comprises:
   extracting, by the server, a transcription from the audio file; and
   comparing, by the server, the transcription from the audio file with a corresponding transcription of the acoustic signal to generate the similarity score.

7. The method of claim 1, wherein comparing the acoustic signal and the audio file comprises:
   extracting, by the server, a set of keywords from the audio file; and
   comparing, by the server, the set of keywords from the audio file with a corresponding set of keywords in the acoustic signal to generate the similarity score.

8. The method of claim 1, wherein the first electronic device is used for a second factor authentication.

9. A system comprising:
   a non-transitory storage medium storing a plurality of computer program instructions; and
   a processor electrically coupled to the non-transitory storage medium and configured to execute the plurality of computer program instructions to:
   receive a first request to authenticate a user from a server associated with a second electronic device, the first request to authenticate the user being generated by the server in response to the second electronic device receiving a voice command from the user;
   transmit a second request to a first electronic device in proximity to the second electronic device causing the first electronic device to execute an authentication function;

transmit a third request to the server to cause the second electronic device to play an acoustic signal;

receive an audio file from the first electronic device in proximity to the second electronic device, wherein the audio file contains the acoustic signal played by the second electronic device and captured by the authentication function in the first electronic device;

compare the acoustic signal and the audio file to generate a similarity score; and authenticate the user in response to the processor determining that the similarity score is above a threshold.

10. The system of claim 9, wherein the acoustic signal is at least one of infrasonic, ultrasonic, and audible signal.

11. The system of claim 9, wherein the processor is further configured execute the plurality of computer program instructions to:

receive the acoustic signal in an encrypted form from the server;

receive the audio file in an encrypted form from the first electronic device; and compare the acoustic signal and the audio file in an encrypted domain to generate the similarity score.

12. The system of claim 9, wherein the processor is further configured execute the plurality of computer program instructions to:

transmit the second request to the first electronic device through a representational state transfer application programming interface.

13. The system of claim 9, wherein the processor is further configured execute the plurality of computer program instructions to:

transmit the second request to the first electronic device through at least one of Internet Protocol channel and mobile message channel.

14. The system of claim 9, wherein to compare the acoustic signal and the audio file, the processor is further configured execute the plurality of computer program instructions to:

extract a transcription from the audio file; and compare the transcription from the audio file with a corresponding transcription of the acoustic signal to generate the similarity score.

15. The system of claim 9, wherein to compare the acoustic signal and the audio file, the processor is further configured execute the plurality of computer program instructions to:

extract a set of keywords from the audio file; and compare the set of keywords from the audio file with a corresponding set of key words in the acoustic signal to generate the similarity score.

16. The system of claim 9, wherein the first electronic device is used for a second factor authentication.

17. A computer implemented method comprising:

receiving, by a server, a first request to enroll a user to a service from a second server, the ft request being generated by the second server in response to receiving a voice command at a second electronic device;

transmitting, by the server, a second request to a first electronic device in proximity to the second electronic device causing the first electronic device to execute an enrollment function;

transmitting, by the server, a third request to the second server to cause the second electronic device to play an acoustic signal;

receiving, by the server, an audio file from the first electronic device in proximity to the second electronic device, wherein the audio file contains the acoustic signal played by the second electronic device and captured by the enrollment function in the first electronic device;

comparing, by the server, the acoustic signal and the audio file to generate a similarity score; and enrolling, by the server, the user to the service in response to the server determining that the similarity score is above a threshold.

18. The method of claim 17, wherein the acoustic signal is at least one of infrasonic, ultrasonic, and audible signal.

19. The method of claim 17, further comprising:

receiving, by the server, the acoustic signal in an encrypted form from the second server;

receiving, by the server, the audio file in an encrypted form from the first electronic device; and comparing, by the server, the acoustic signal and the audio file in an encrypted domain to generate the similarity score.

20. The method of claim 17, further comprising:

transmitting, by the server, the second request to the first electronic device through a representational state transfer application programming interface.

\* \* \* \* \*